INVENTORS.
JAMES G. PEARCE
ALLAN C. TETRAULT
BY Robert Nathans
ATTORNEY

MAKE-UP OF A SINGLE RECIRCULATING CELL

| SUBCELL | |
|---|---|
| 1 | |
| 2 | START OF CELL |
| 3 | |
| 4 | |
| 5 | START OF FRAME |
| 6 | CELL IN PROCESSING |
| 7 | ON-OFF HOOK |
| 8 | |
| 9 | IMPULSE ANALYZER |
| 10 | |
| 11 | COUNT OF TWO |
| 12 | RESET |
| 13 | RELEASE REGISTER |
| 14 | IMPULSE RECEIVED |
| 15 | CALL IN TRANSLATOR |
| 16 | |
| 17 | RESET STORE |
| 18 | |
| 19 | IMPULSE STEERING COUNTER |
| 20 | |
| 21 | REQUEST FOR TRANSLATION |
| 22 | RESET STORE |
| 23 | ← READIN TO BUFFER STORE 212 |
| 24 | |
| 25 | FIRST DIGIT STORE |
| 26 | ← READOUT TO BUFFER STORE 212 |
| 27 | RESET STORE |
| 28 | ← READIN TO BUFFER STORE 212 |
| 29 | 2ND DIGIT STORE |
| 30 | |
| 31 | ← READOUT TO BUFFER STORE 212 |
| 32 | RESET STORE |
| 33 | |
| 34 | |
| 35 | 3RD DIGIT STORE |
| 36 | |
| 37 | RESET STORE |
| 38 | |
| 39 | |
| 40 | 4TH DIGIT STORE |
| 41 | |
| 42 | RESET STORE |
| 43 | |
| 44 | |
| 45 | 5TH DIGIT STORE |
| 46 | |
| 47 | RESET STORE |
| 48 | |
| 49 | 6TH DIGIT STORE |
| 50 | |

| SUBCELL | |
|---|---|
| 51 | 6TH DIGIT STORE (CONT.) |
| 52 | RESET |
| 53 | |
| 54 | |
| 55 | 7TH DIGIT STORE |
| 56 | |
| 57 | RESET |
| 58 | |
| 59 | |
| 60 | DIGITS SENT STORE |
| 61 | |
| 62 | RESET |
| 63 | |
| 64 | |
| 65 | 40 M sec. COUNTER |
| 66 | |
| 67 | RESET |
| 68 | |
| 69 | 600 M sec. COUNTER |
| 70 | INTERDIGITAL PAUSE |
| 71 | |
| 72 | RESET |
| 73 | |
| 74 | 9 sec. COUNTER |
| 75 | TIME OUT |
| 76 | |
| 77 | RESET |
| 78 | |
| 79 | 27 sec. COUNTER |
| 80 | OUTGOING DIGIT STORE WAS 1 |
| 81 | |
| 82 | RESET |
| 83 | |
| 84 | |
| 85 | SPARES |
| 86 | |
| 87 | RESET |
| 88 | |
| 89 | IMPULSE RECONTRUCTION COUNTER |
| 90 | |
| 91 | START SENDING DIGIT |
| 92 | RESET (INTERDIGIT PERIOD IS OVER) |
| 93 | |
| 94 | |
| 95 | |
| 96 | OUTGOING DIGIT STORE |
| 97 | |
| 98 | IMPULSE GOING |
| 99 | RESET |
| 100 | START OF CELL |

Fig. 1B

April 4, 1967 J. G. PEARCE ETAL 3,312,786

MULTIPLE ELECTRONIC REGISTER SENDER

Filed Aug. 7, 1963 22 Sheets-Sheet 9

April 4, 1967 J. G. PEARCE ETAL 3,312,786

MULTIPLE ELECTRONIC REGISTER SENDER

Filed Aug. 7, 1963 22 Sheets-Sheet 10

IMPULSE DISTRIBUTOR

IMPULSING ANALYZING COUNTING RATE

April 4, 1967 J. G. PEARCE ETAL 3,312,786

MULTIPLE ELECTRONIC REGISTER SENDER

Filed Aug. 7, 1963 22 Sheets-Sheet 13

April 4, 1967 J. G. PEARCE ETAL 3,312,786

MULTIPLE ELECTRONIC REGISTER SENDER

Filed Aug. 7, 1963 22 Sheets-Sheet 16

April 4, 1967 J. G. PEARCE ETAL 3,312,786

MULTIPLE ELECTRONIC REGISTER SENDER

Filed Aug. 7, 1963 22 Sheets-Sheet 18

DIGITS SENT STORE

ROUTE CARD STEER FILPFLOPS 1213

COUNT IN DIGITS SENT STORE

| | | | | | | |
|---|---|---|---|---|---|---|
| 8 | 4 | $\overline{2}$ | 1 | = | 13 | |
| 8 | 4 | $\overline{2}$ | $\overline{1}$ | = | 12 | |
| 8 | $\overline{4}$ | 2 | 1 | = | 11 | |
| 8 | $\overline{4}$ | 2 | $\overline{1}$ | = | 10 | |
| 8 | $\overline{4}$ | $\overline{2}$ | 1 | = | 9 | |
| 8 | $\overline{4}$ | $\overline{2}$ | $\overline{1}$ | = | 8 | ALL ROUTING DIGITS OUTPULSED |
| $\overline{8}$ | 4 | 2 | 1 | = | 7 | SPILLOUT BEGINS |
| $\overline{8}$ | 4 | 2 | $\overline{1}$ | = | 6 | |
| $\overline{8}$ | 4 | $\overline{2}$ | 1 | = | 5 | |
| $\overline{8}$ | 4 | $\overline{2}$ | $\overline{1}$ | = | 4 | |
| $\overline{8}$ | $\overline{4}$ | 2 | 1 | = | 3 | |
| $\overline{8}$ | $\overline{4}$ | 2 | $\overline{1}$ | = | 2 | |
| $\overline{8}$ | $\overline{4}$ | $\overline{2}$ | 1 | = | 1 | |
| $\overline{8}$ | $\overline{4}$ | $\overline{2}$ | $\overline{1}$ | = | 0 | |

Fig. 17H

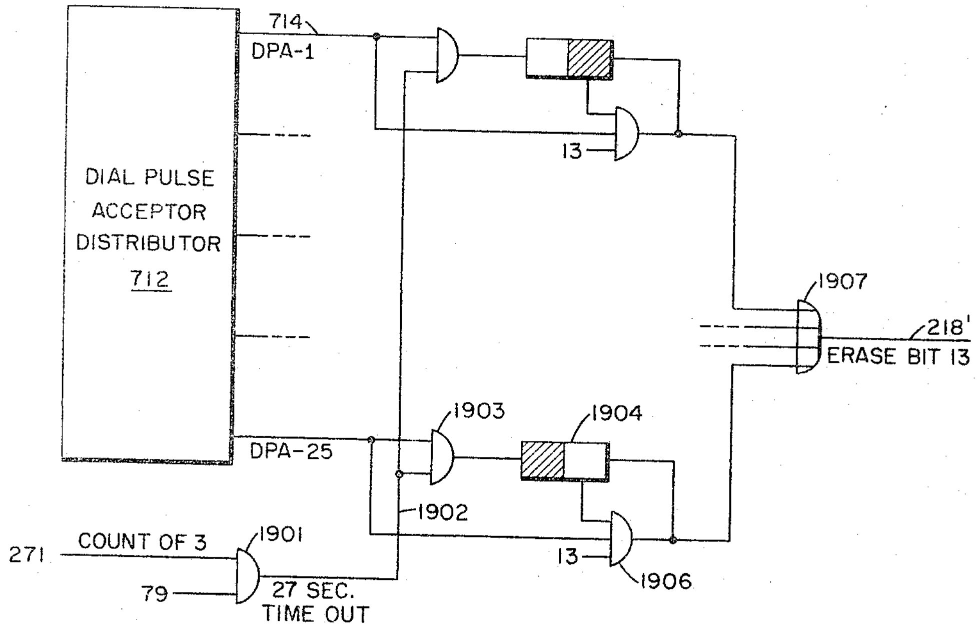

Fig. 19

April 4, 1967 J. G. PEARCE ETAL 3,312,786

MULTIPLE ELECTRONIC REGISTER SENDER

Filed Aug. 7, 1963 22 Sheets-Sheet 21

3,312,786
MULTIPLE ELECTRONIC REGISTER SENDER

James Gordon Pearce, Webster, N.Y., and Allan Curtis Tetrault, Marlborough, Mass., assignors, by mesne assignments, to Stromberg-Carlson Corporation, Rochester, N.Y., a corporation of Delaware Filed Aug. 7, 1963, Ser. No. 300,557
39 Claims. (Cl. 179—18)

The present invention relates to a novel complex of electronic register senders which may be employed in electro-mechanical or electronic telephone exchanges.

Regarding stations within the same numbering plan area, it is desirable in the interest of economy to permit a calling party to dial only the called party's telephone number (e.g., seven digits), and not a number of additional routing digits, to route the call to the proper exchange within the area. It is therefore necessary that register senders be provided for storing the called party's telephone number, inspecting the number, and automatically adding the proper routing digits so that operators are not required to set up the call.

The multiple register sender of the present invention is utilized to replace a large number of prior art register senders. A single delay line in a recirculation loop is time division multiplexed with a large number of dial pulse acceptors, which may be regarded for the purpose of this disclosure as repeaters, each of which operates in conjunction with a linefinder and a first selector to feed dialed impulses from the linefinder to the multiple register sender and to forward reconstructed impulses from the multiple register sender to the selectors. The data from each dial pulse acceptor will be stored timewise in a portion of the recirculating memory, which portion is designated as a cell or register. Thus, the number of cells or registers, each of which is associated with a particular dial pulse acceptor, is derived from the "length" of the line divided by the "length" of impulse information and control data required for each register. Some of the multiple register senders built in accordance with the present invention utilize a single recirculating dynamic storage loop for containing as many as forty-eight registers. Since intervals of time are utilized for dynamic storage instead of storage devices which exist physically, as in the case of conventional register senders, the economic advantages of the present invention are obvious.

It is, therefore, the principal object of the present invention to provide a novel high-speed multiple register sender which utilizes a single all electronic system for replacing a large number of prior art register senders, thereby to effect considerable economic savings.

Further objects and advantages of the invention will become apparent as the following description proceeds, and the features of novelty which characterize the invention will be pointed out with particularity in the claims annexed to and forming a part of this specification.

Figure 1A:
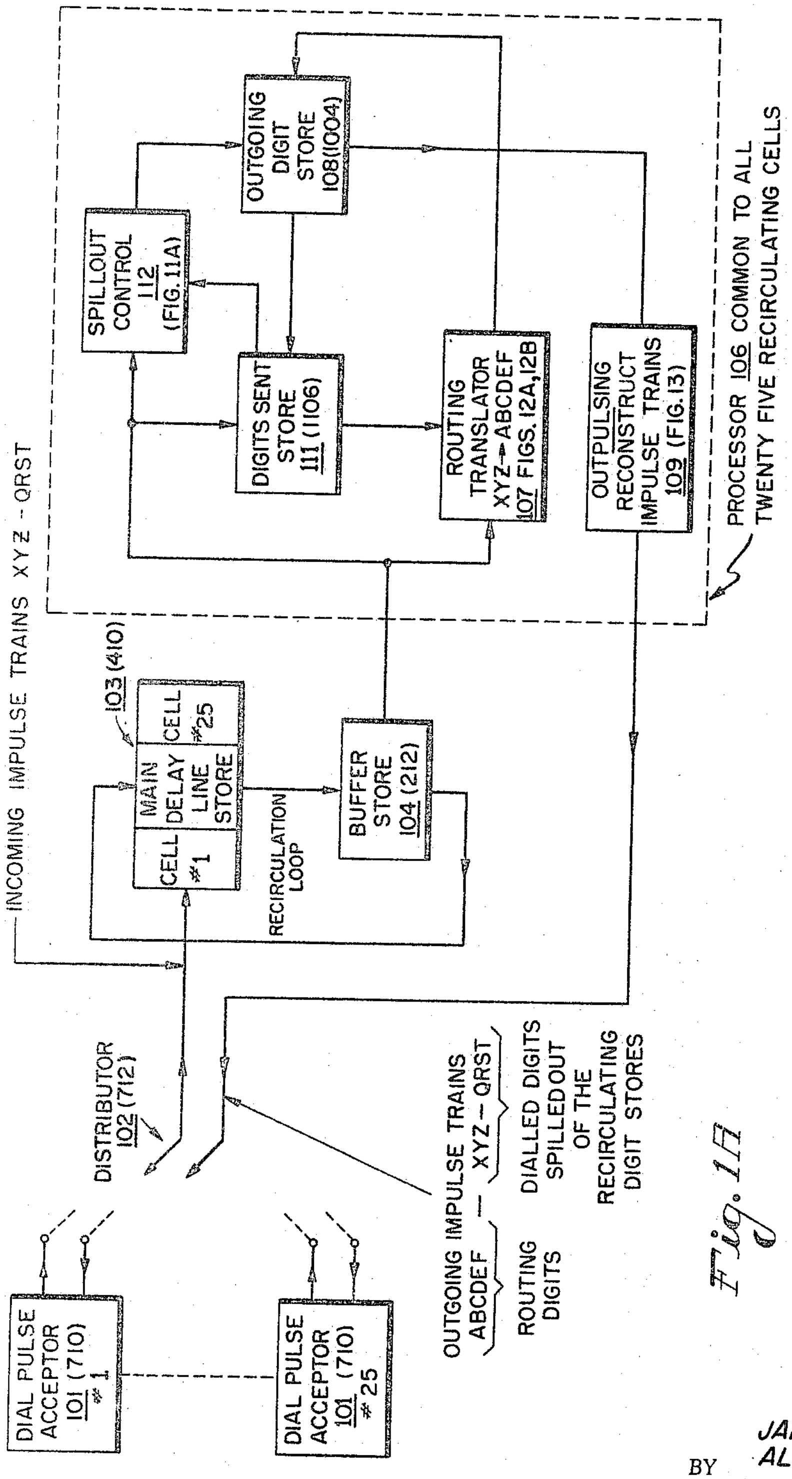
Figure 20:
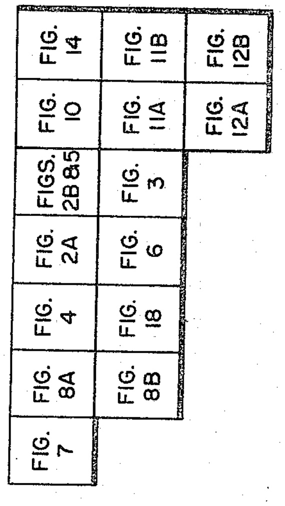
Figure 2A:
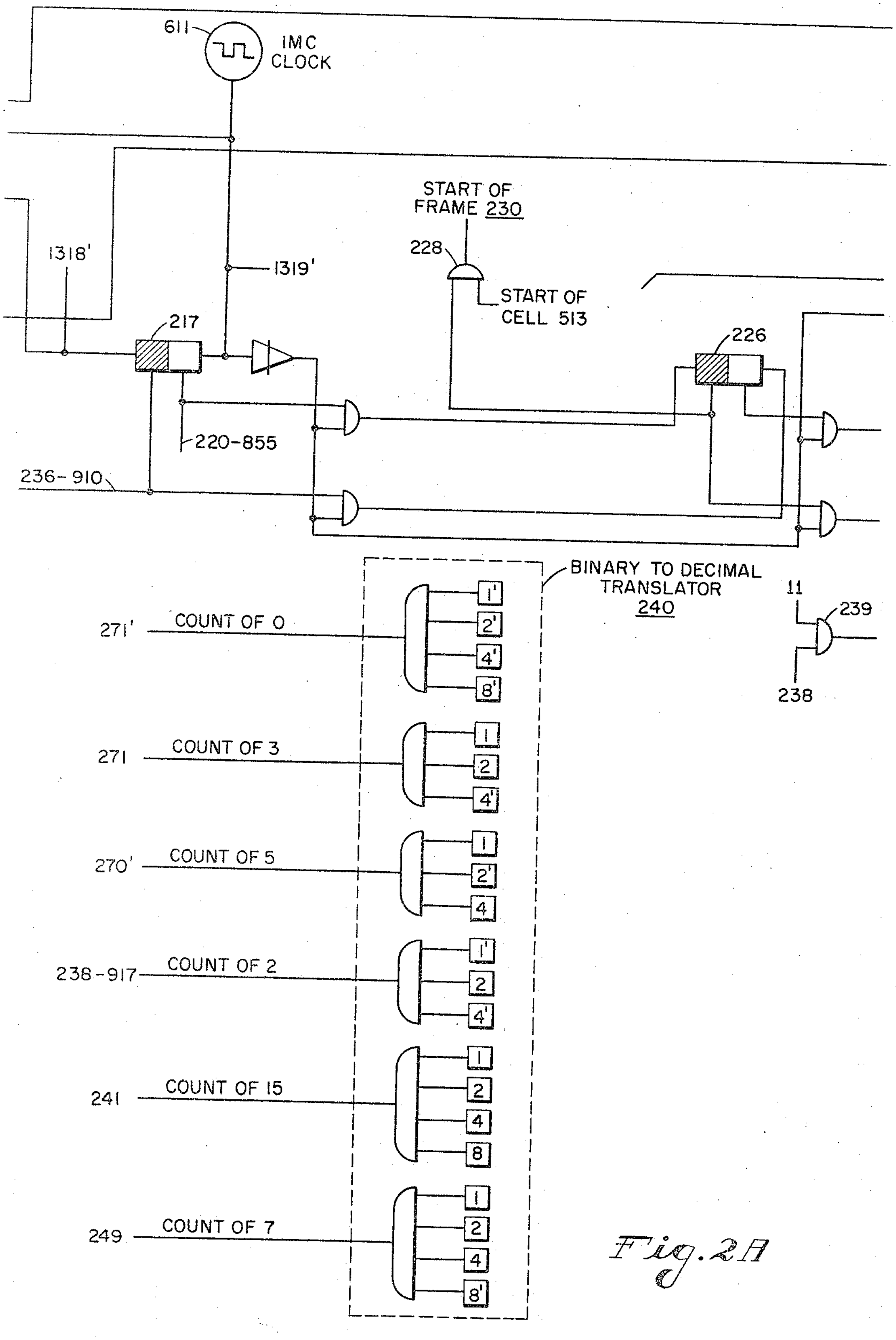
Figures 2B, 5:
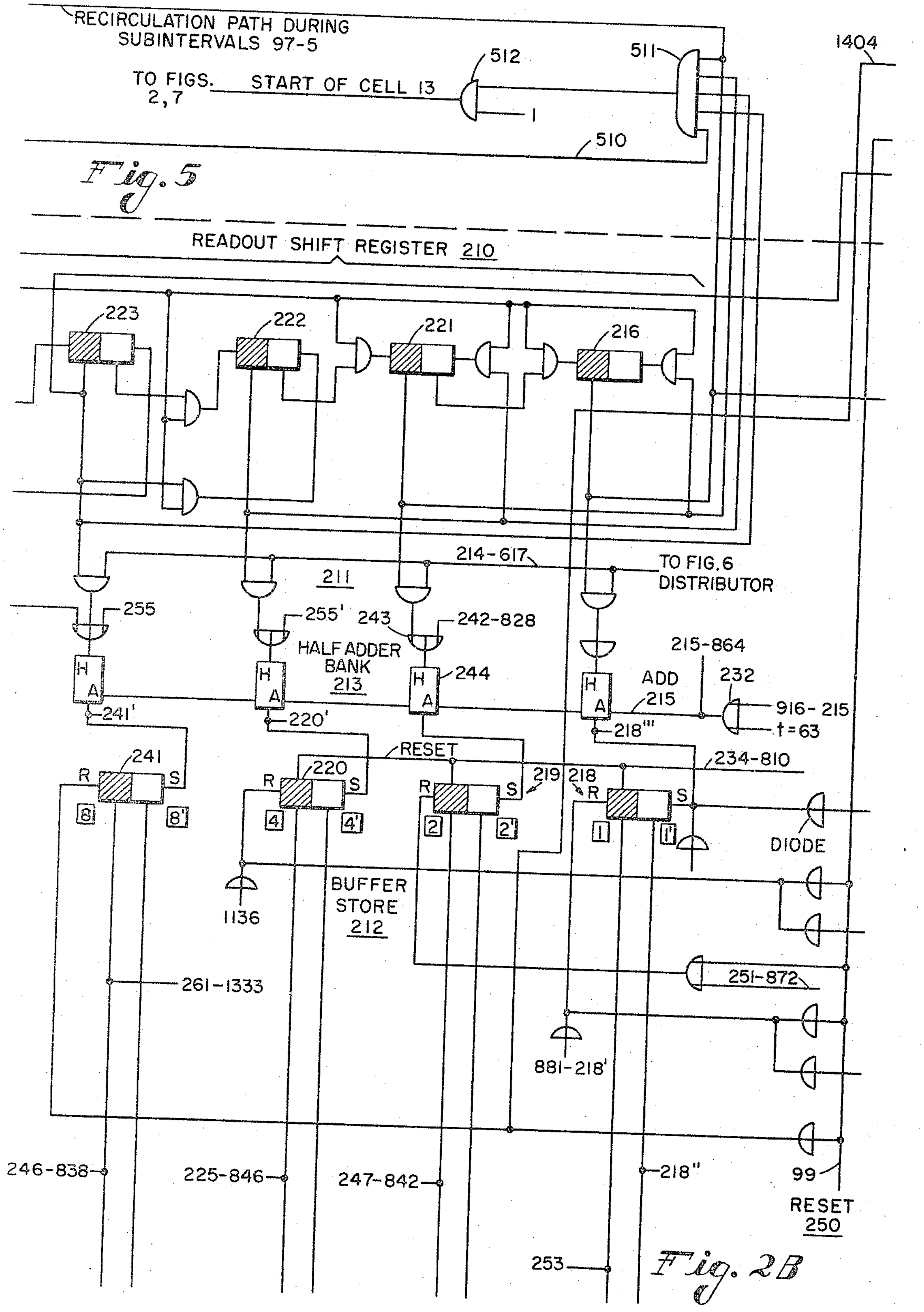
Figure 3:
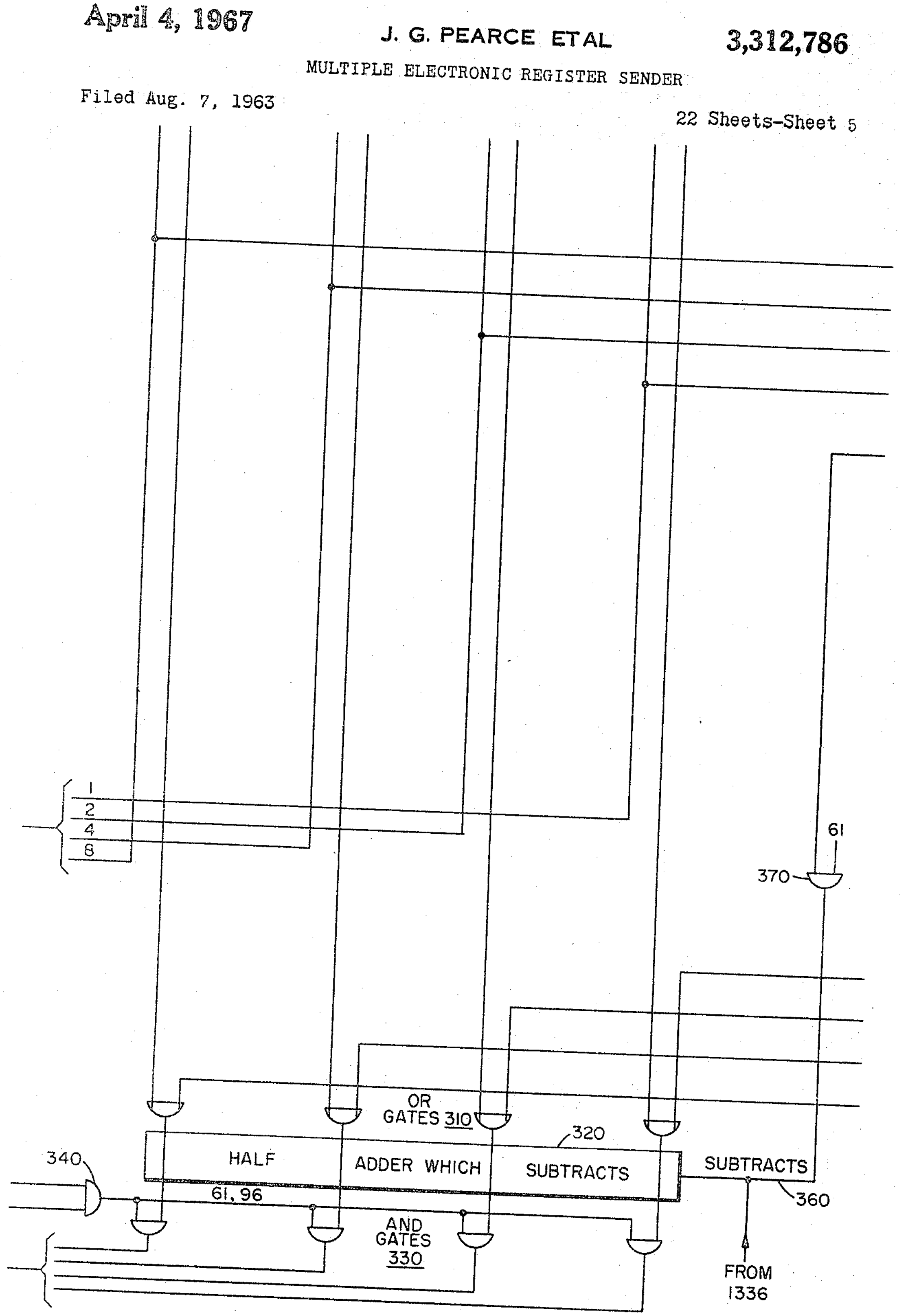
Figure 4:
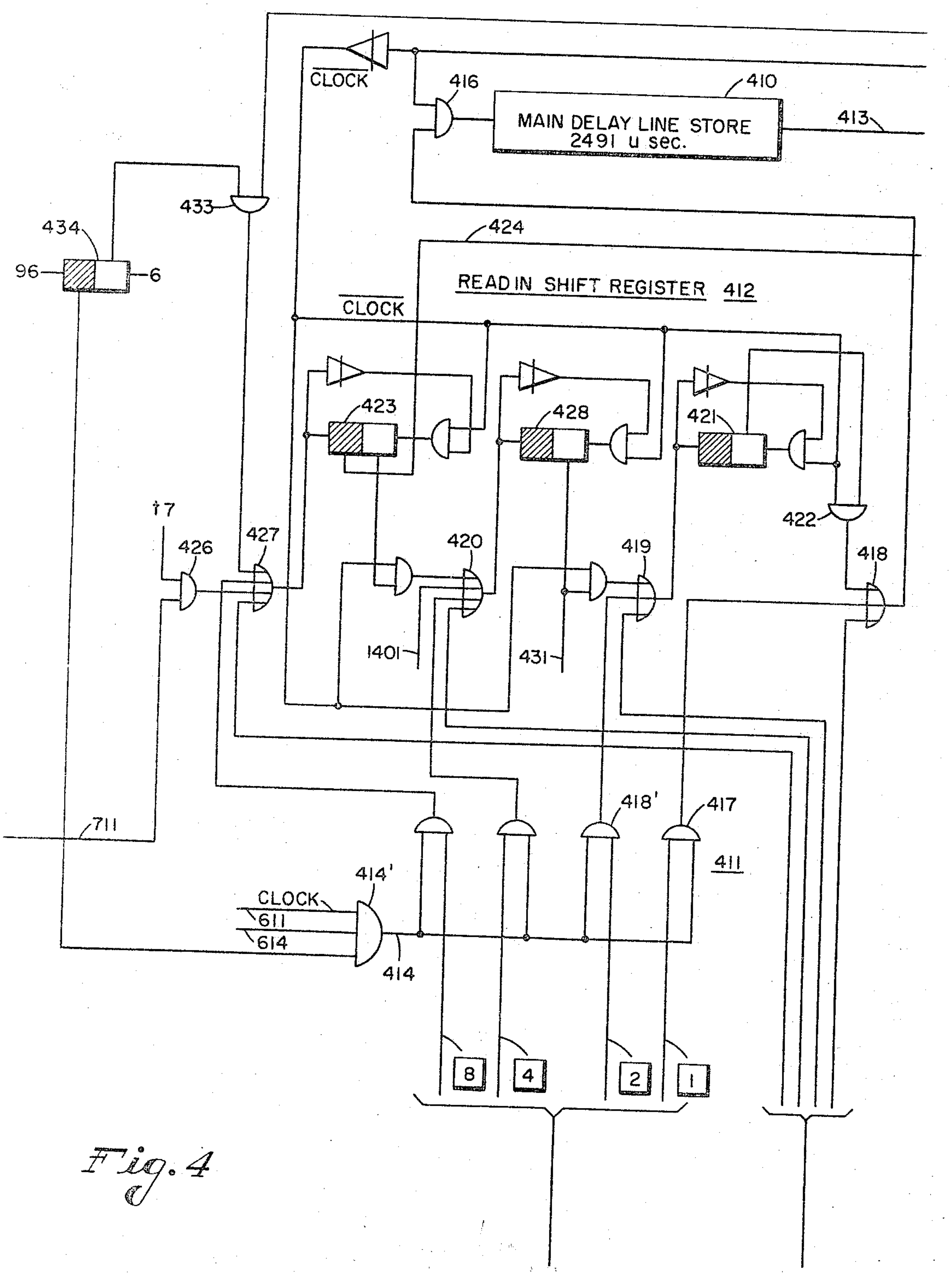
Figure 6:
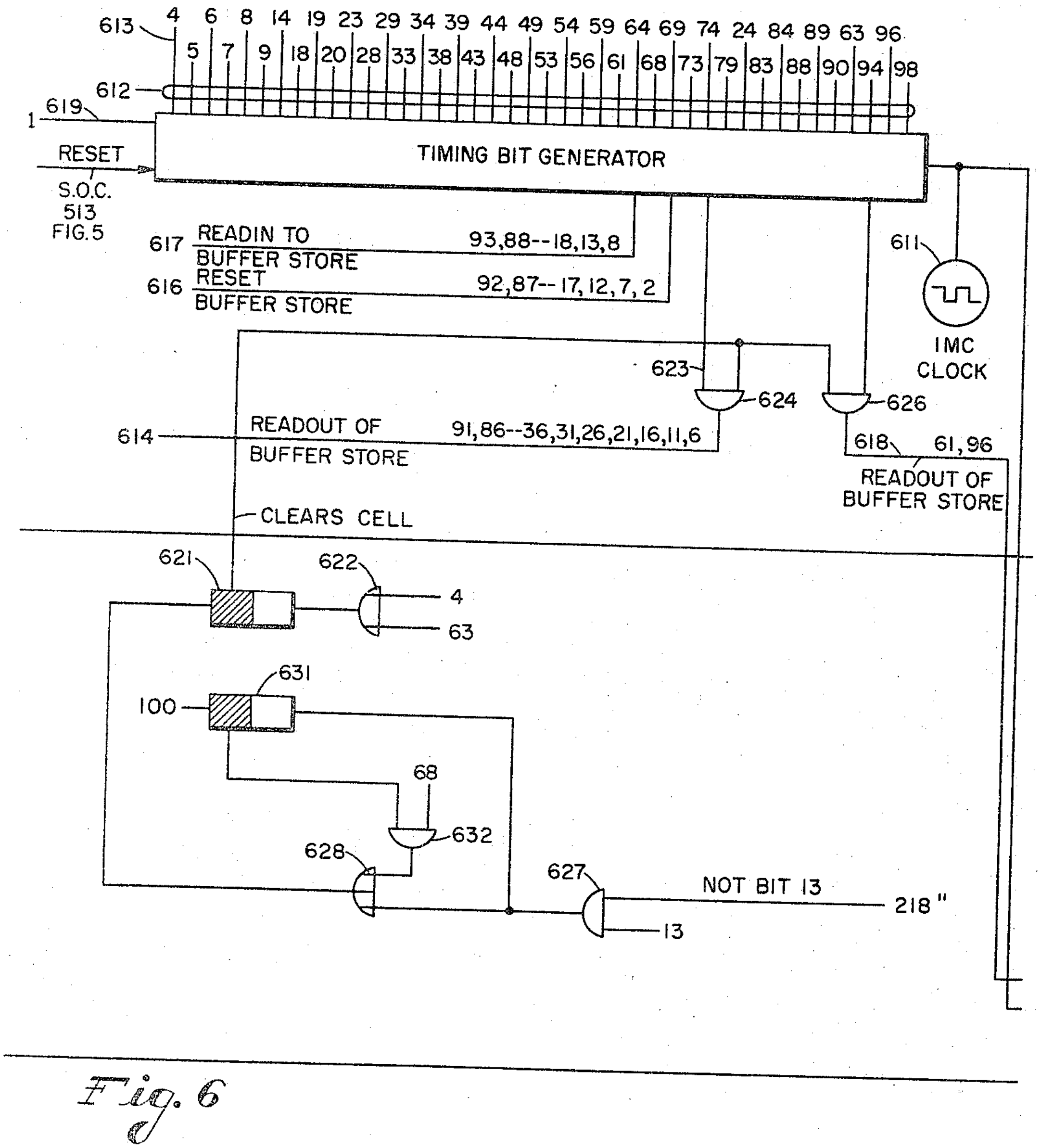
Figure 7:
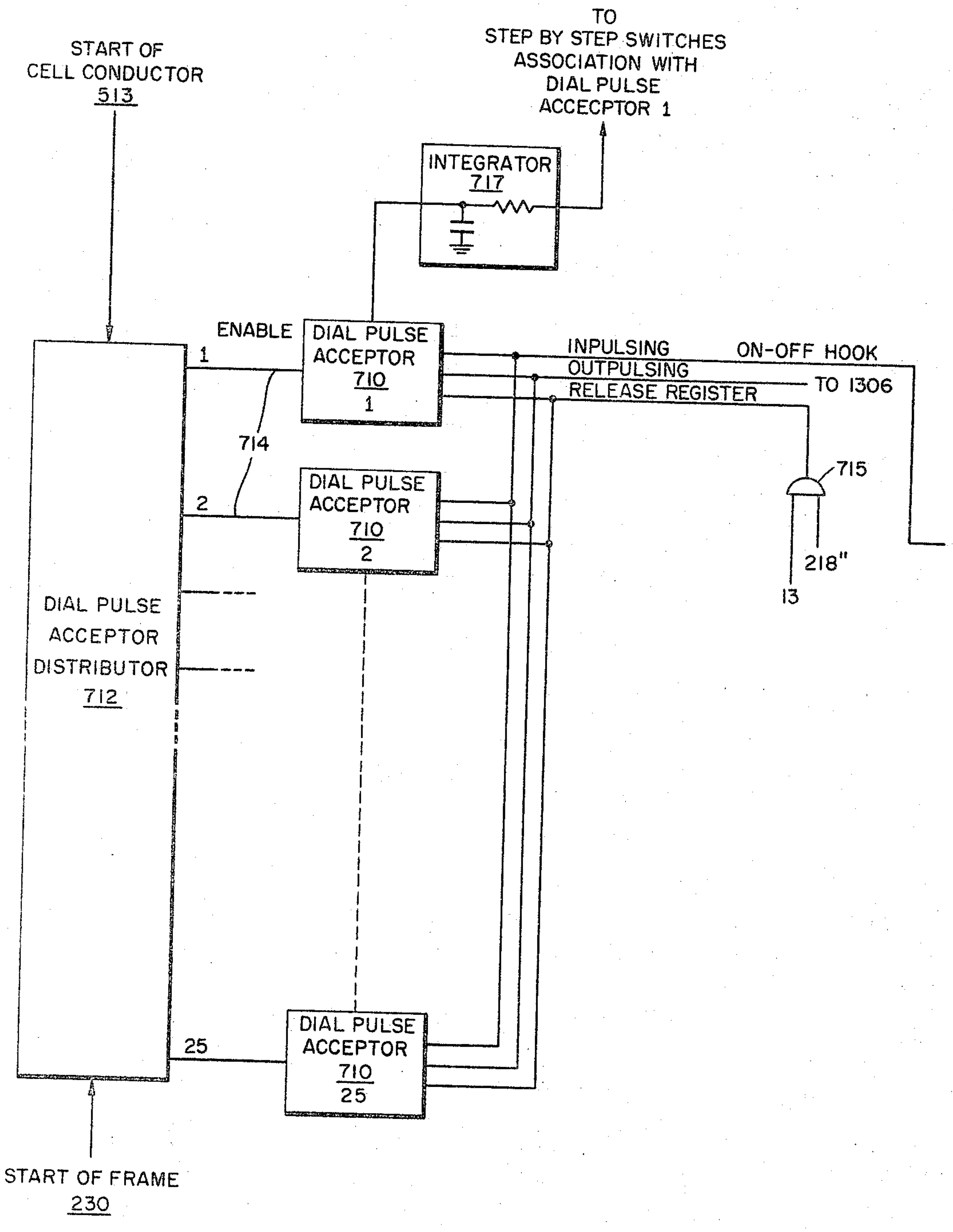
Figure 8A:
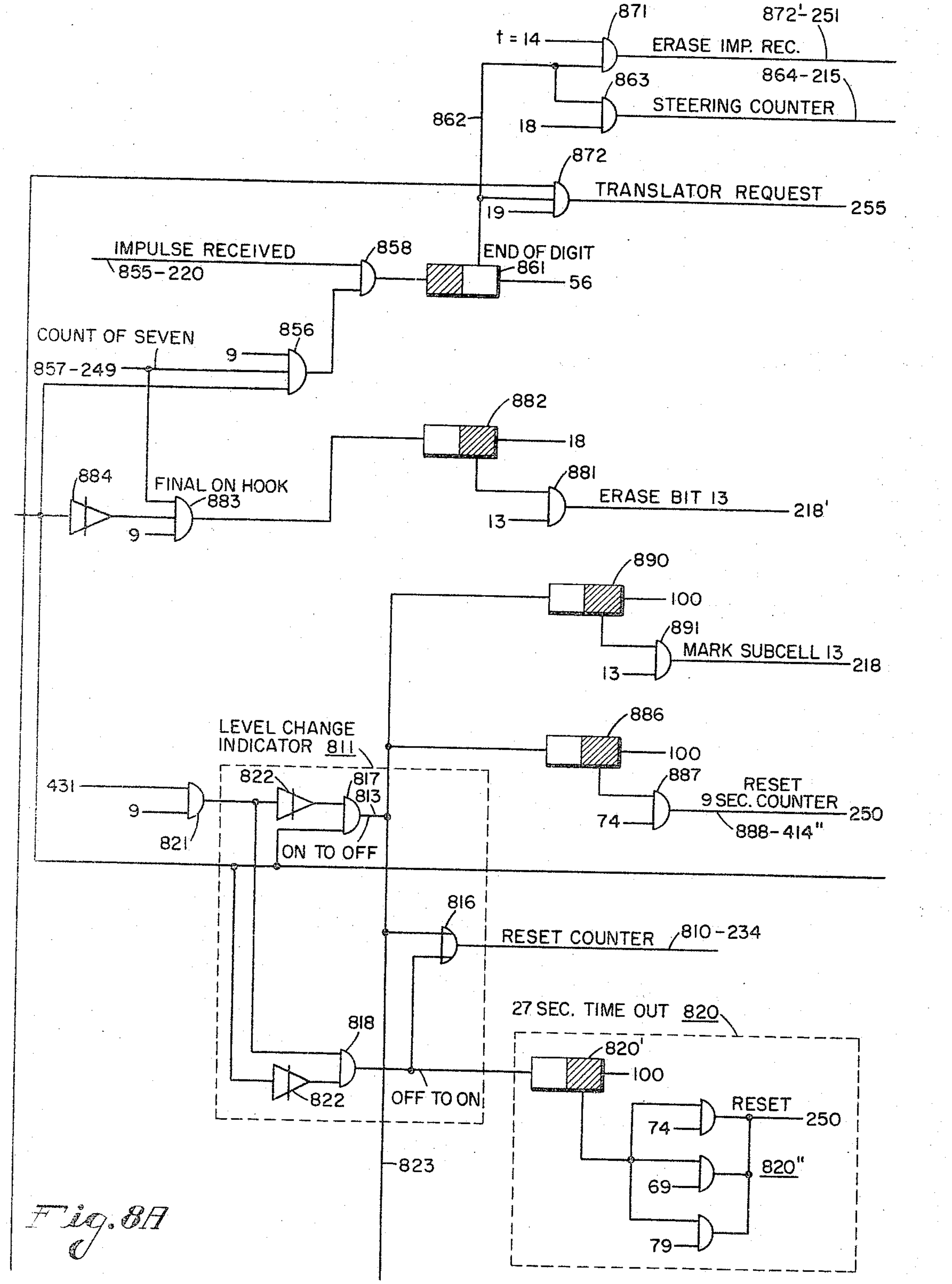
Figure 8B:
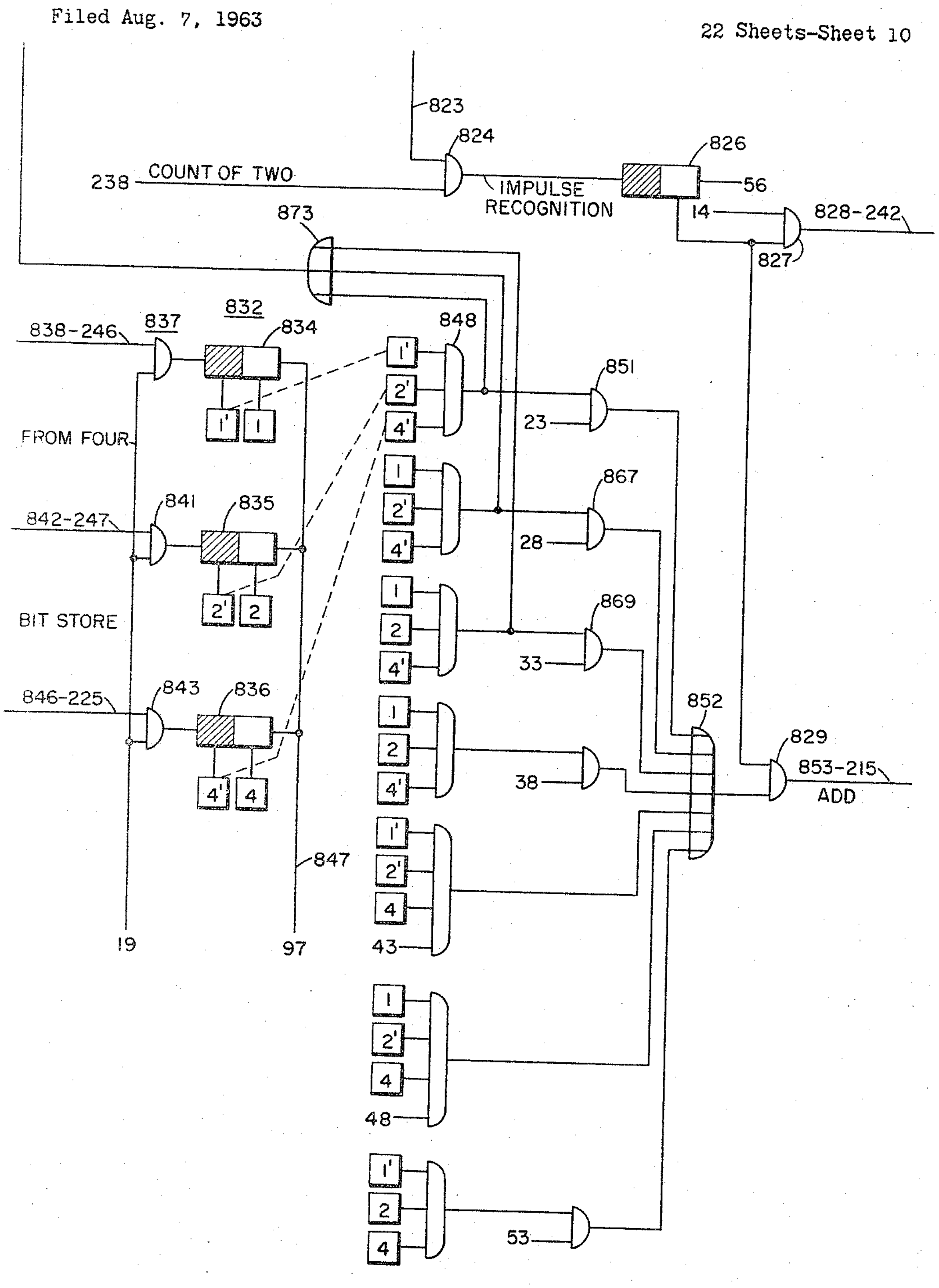
Figure 9:
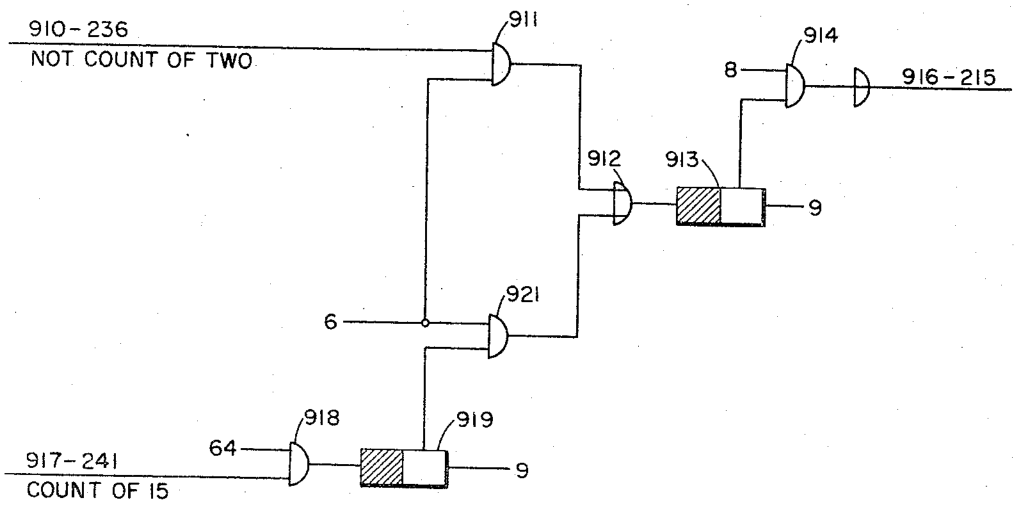
Figure 10:
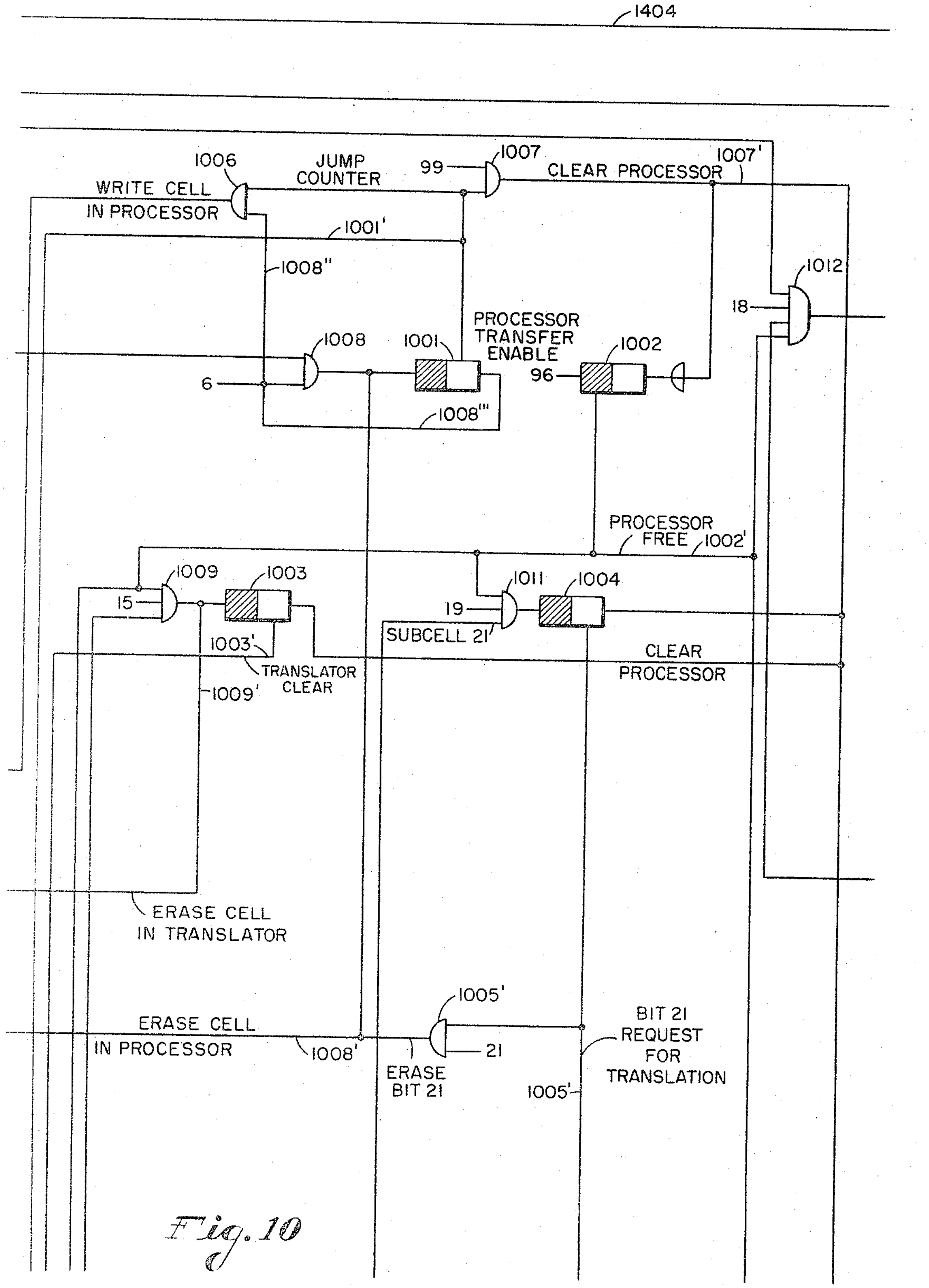
Figure 11A:
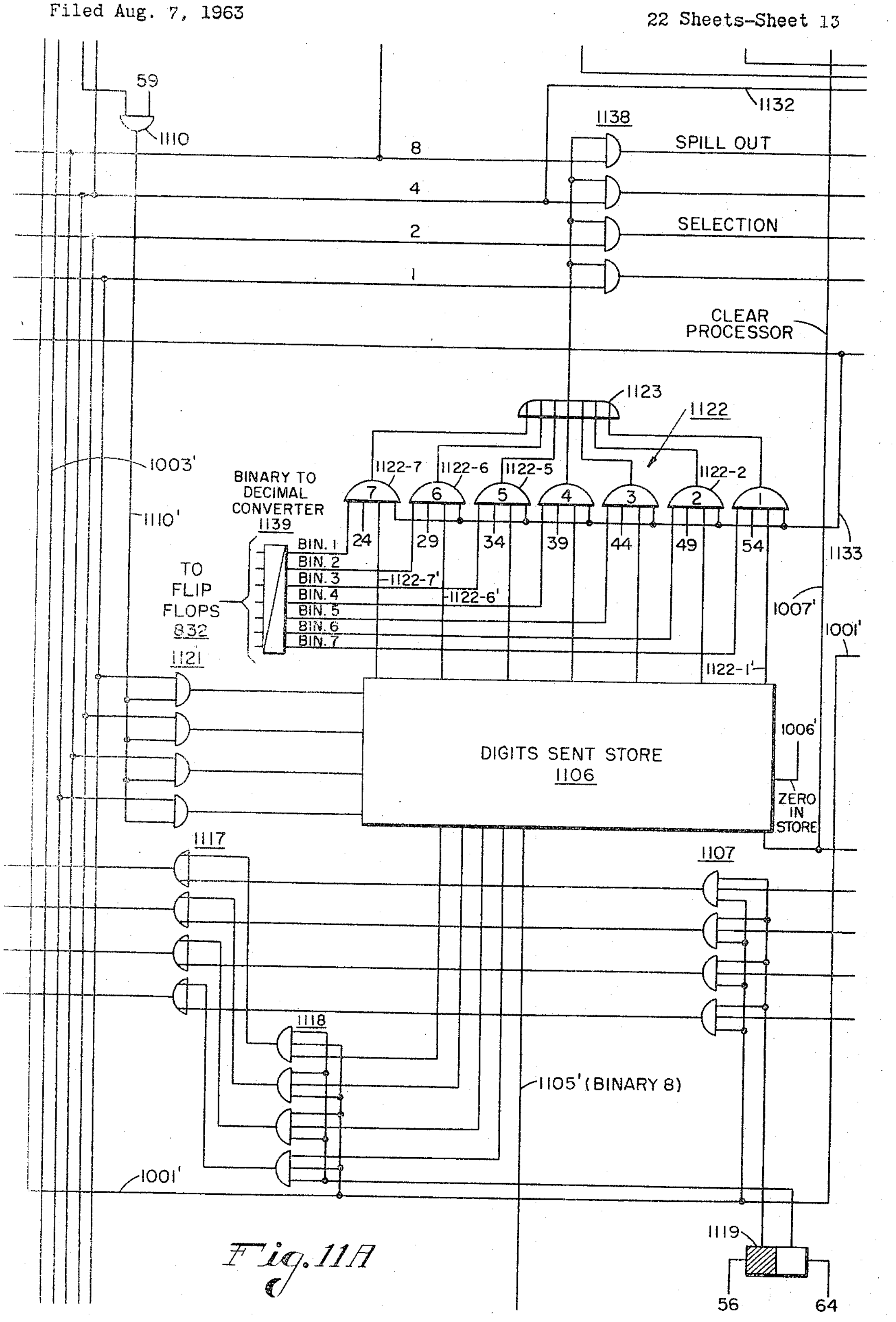
Figure 11B:
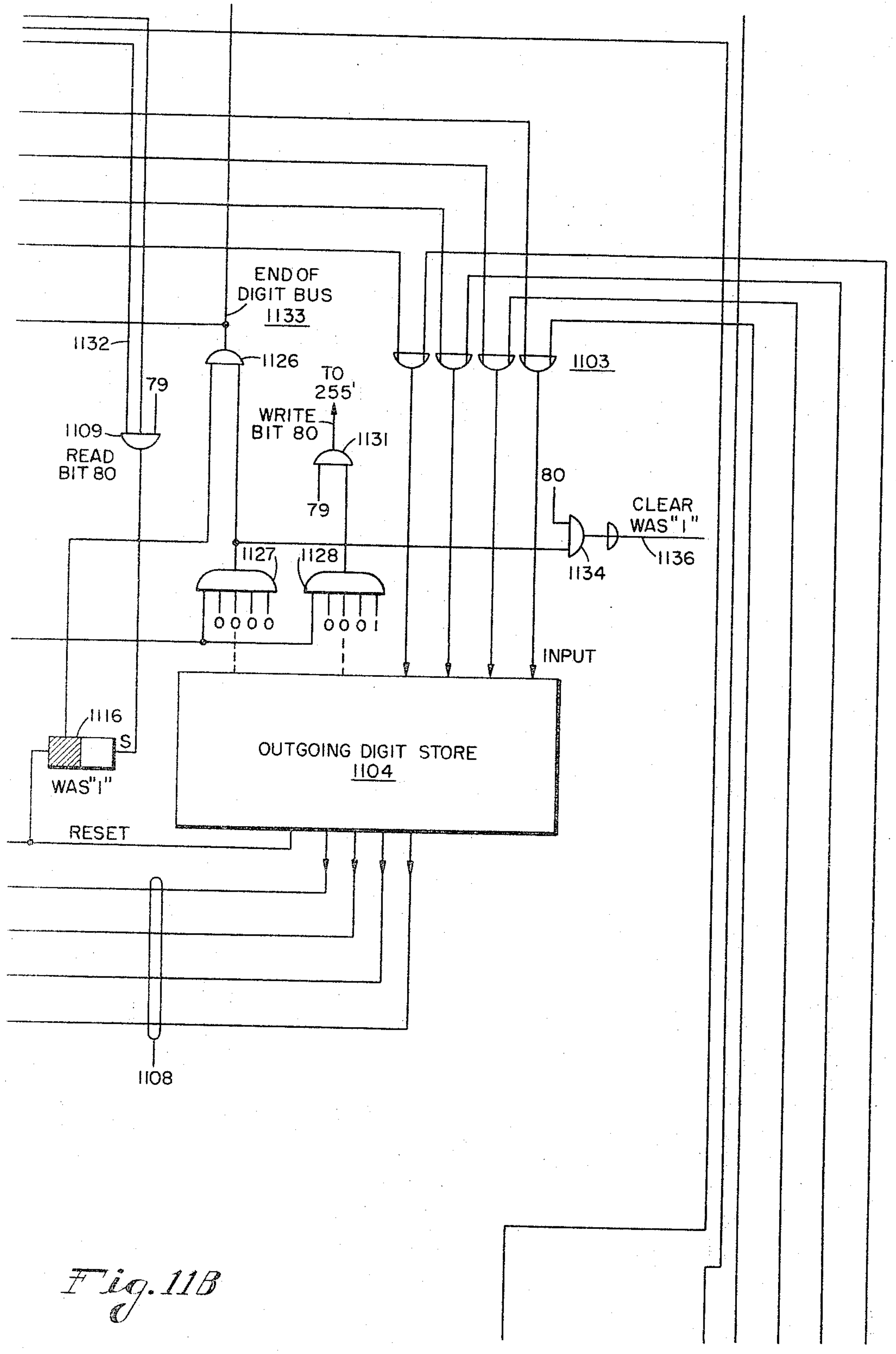
Figure 12A:
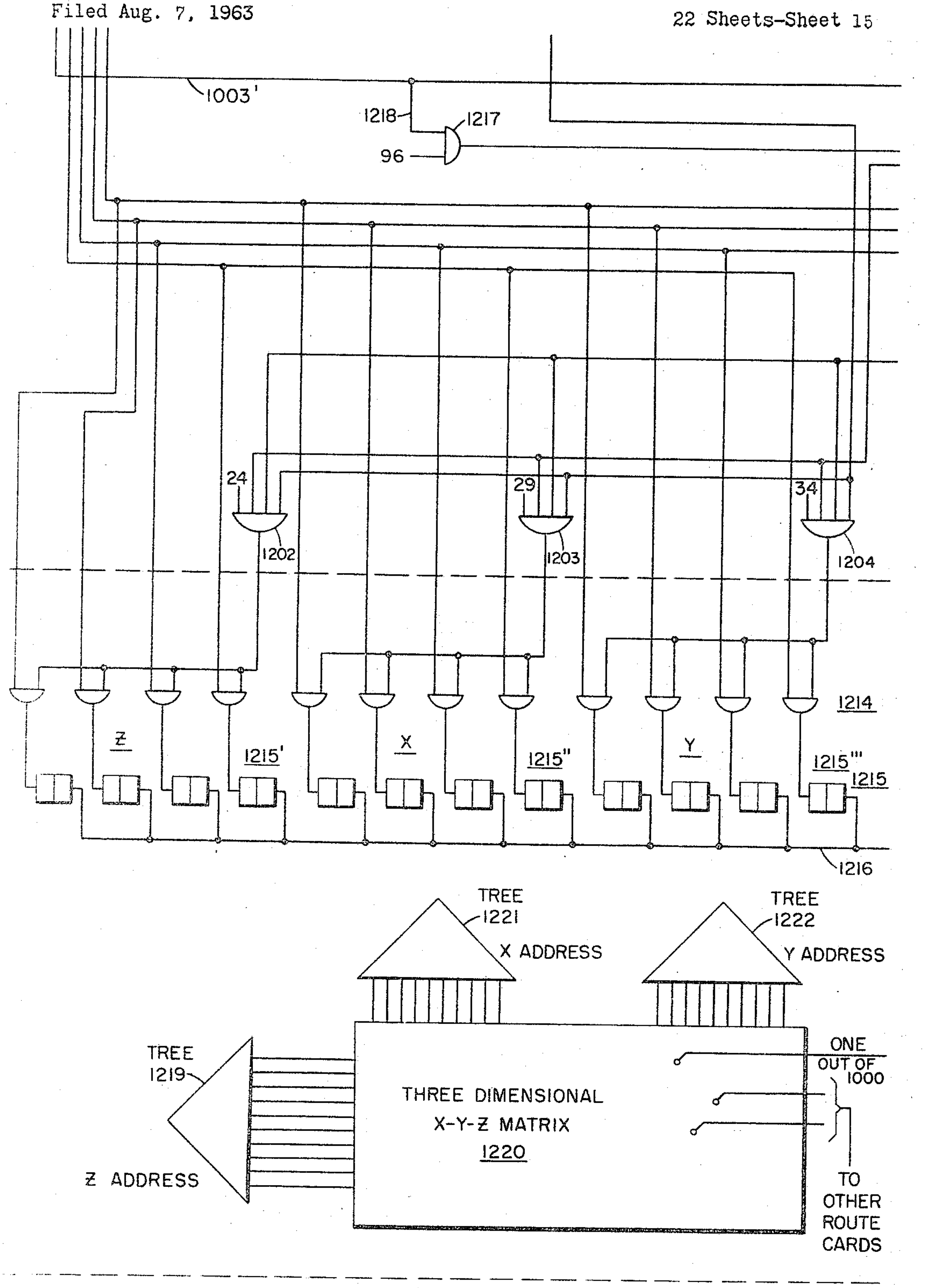
Figure 12B:
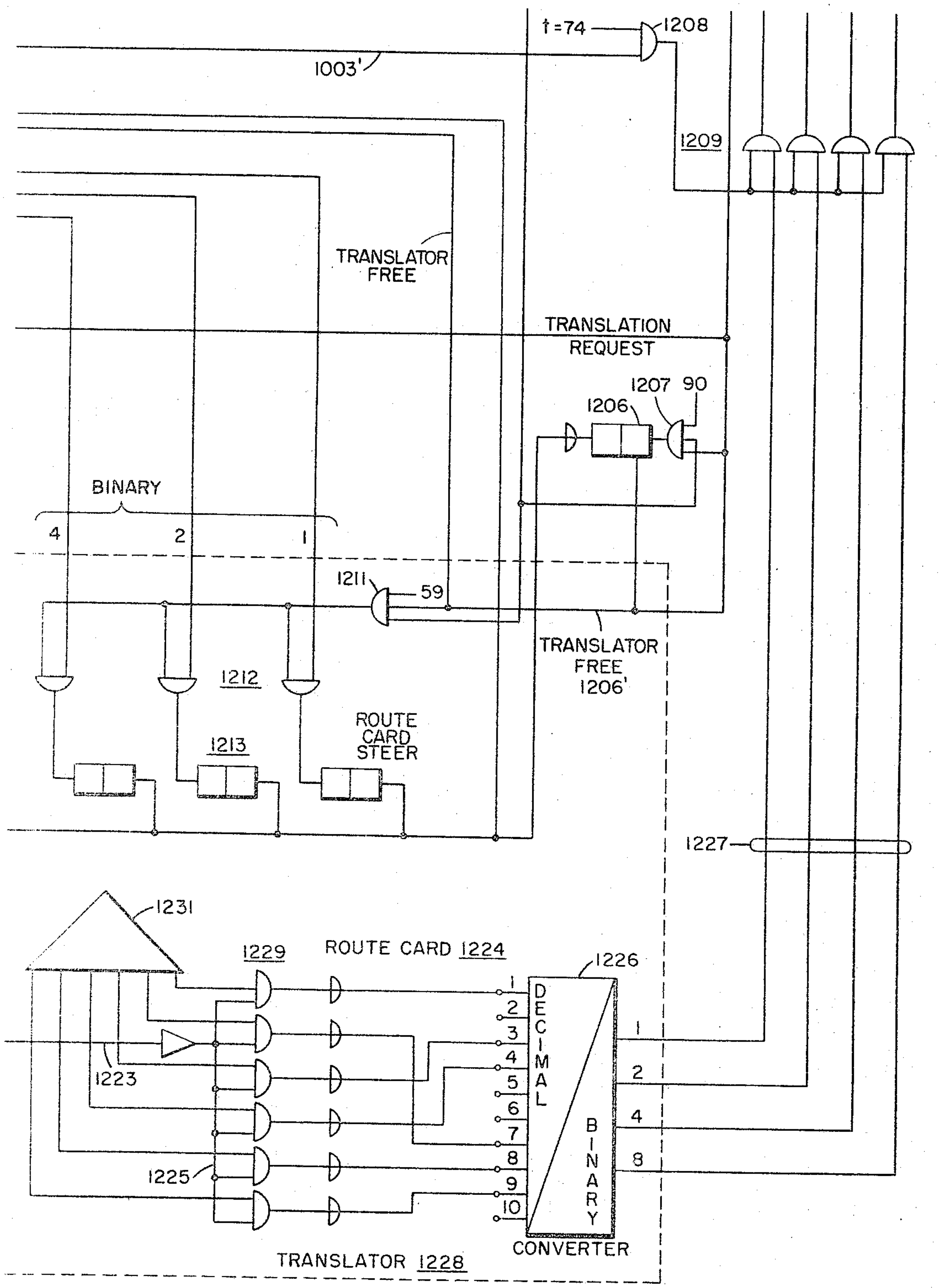
Figure 13:
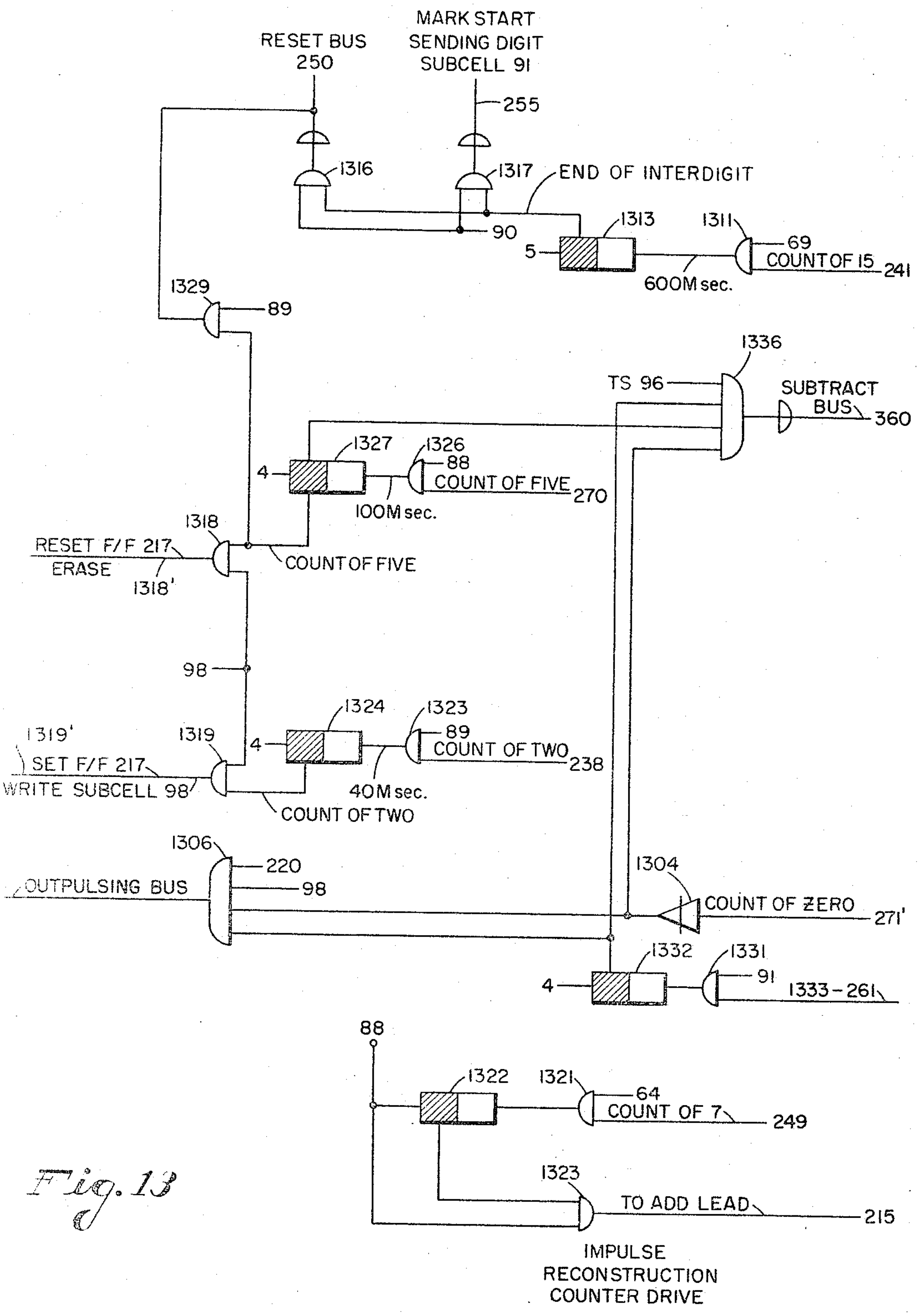
Figure 14:
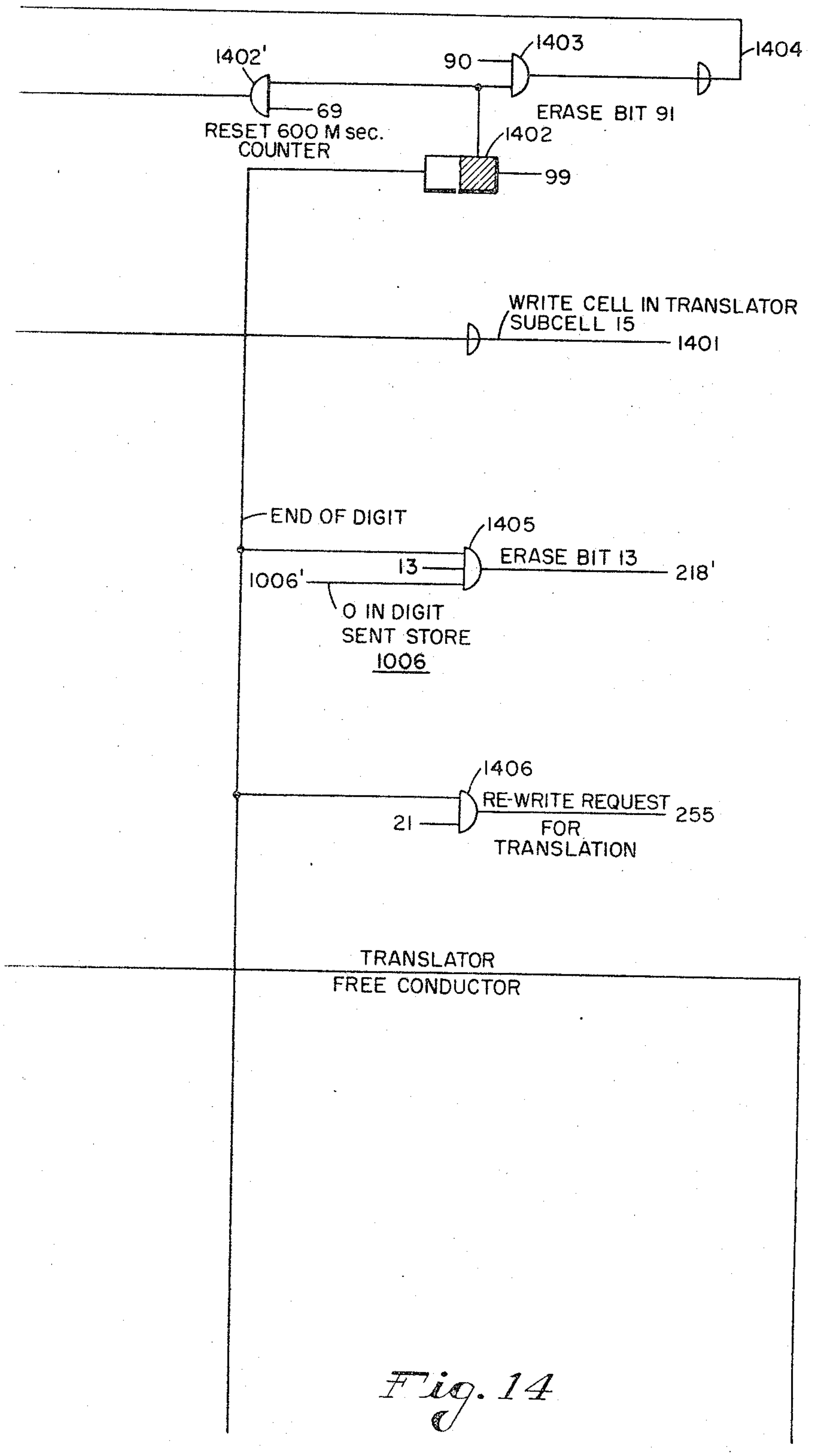
Figure 15:
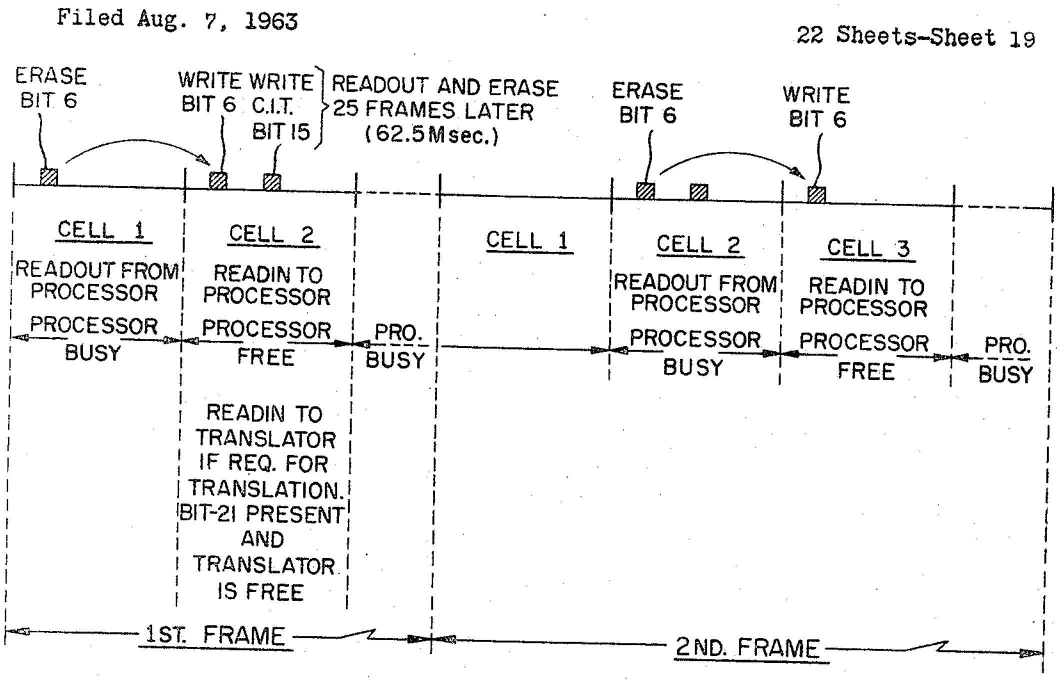
Figure 16:
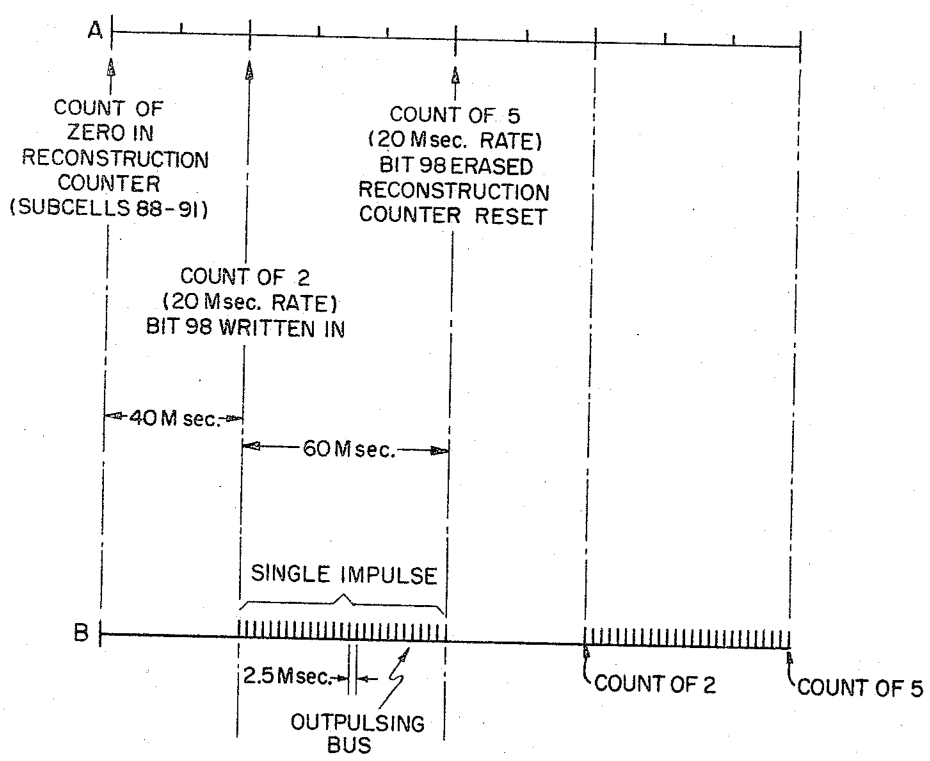
Figure 17B:
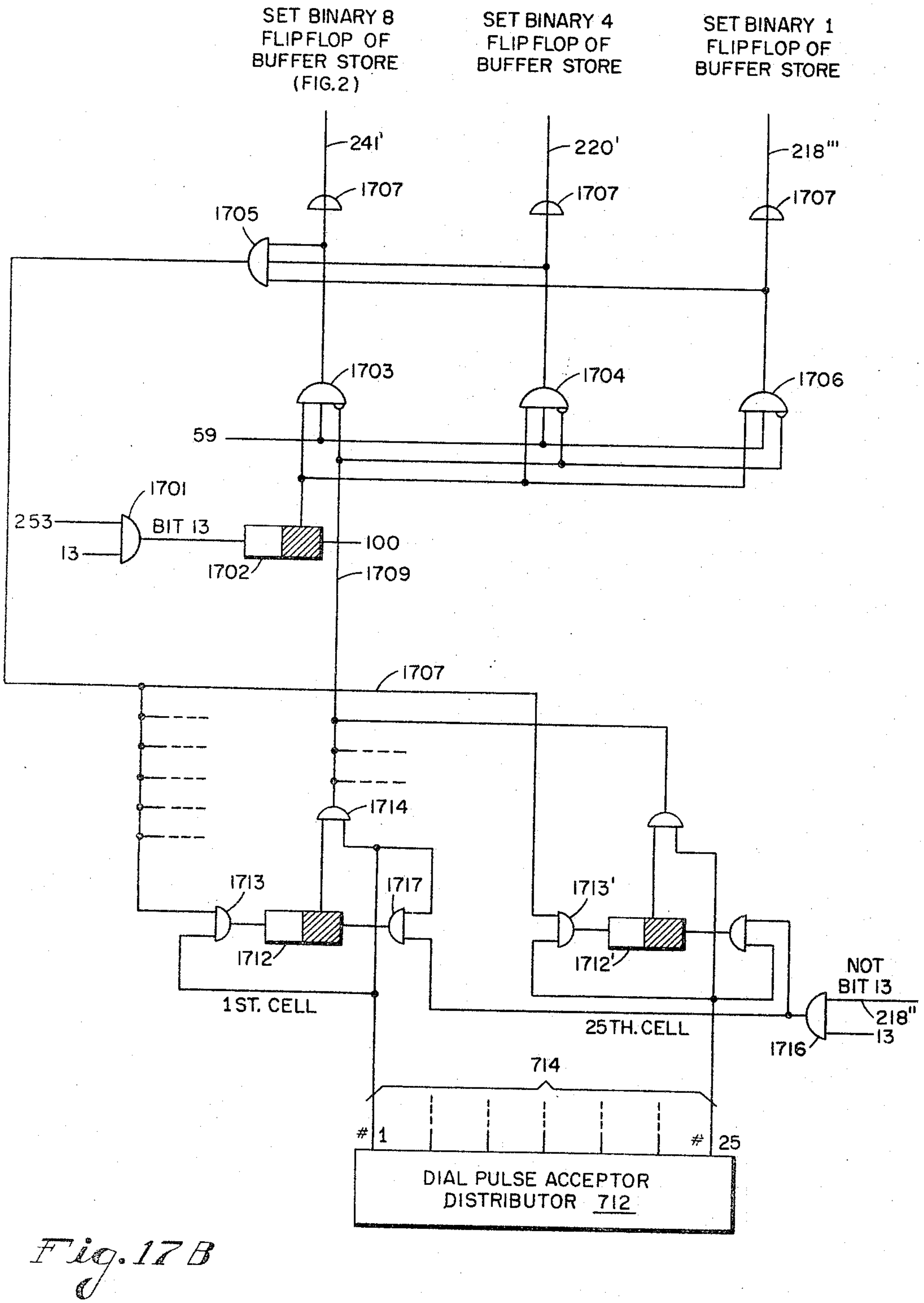
Figure 18:
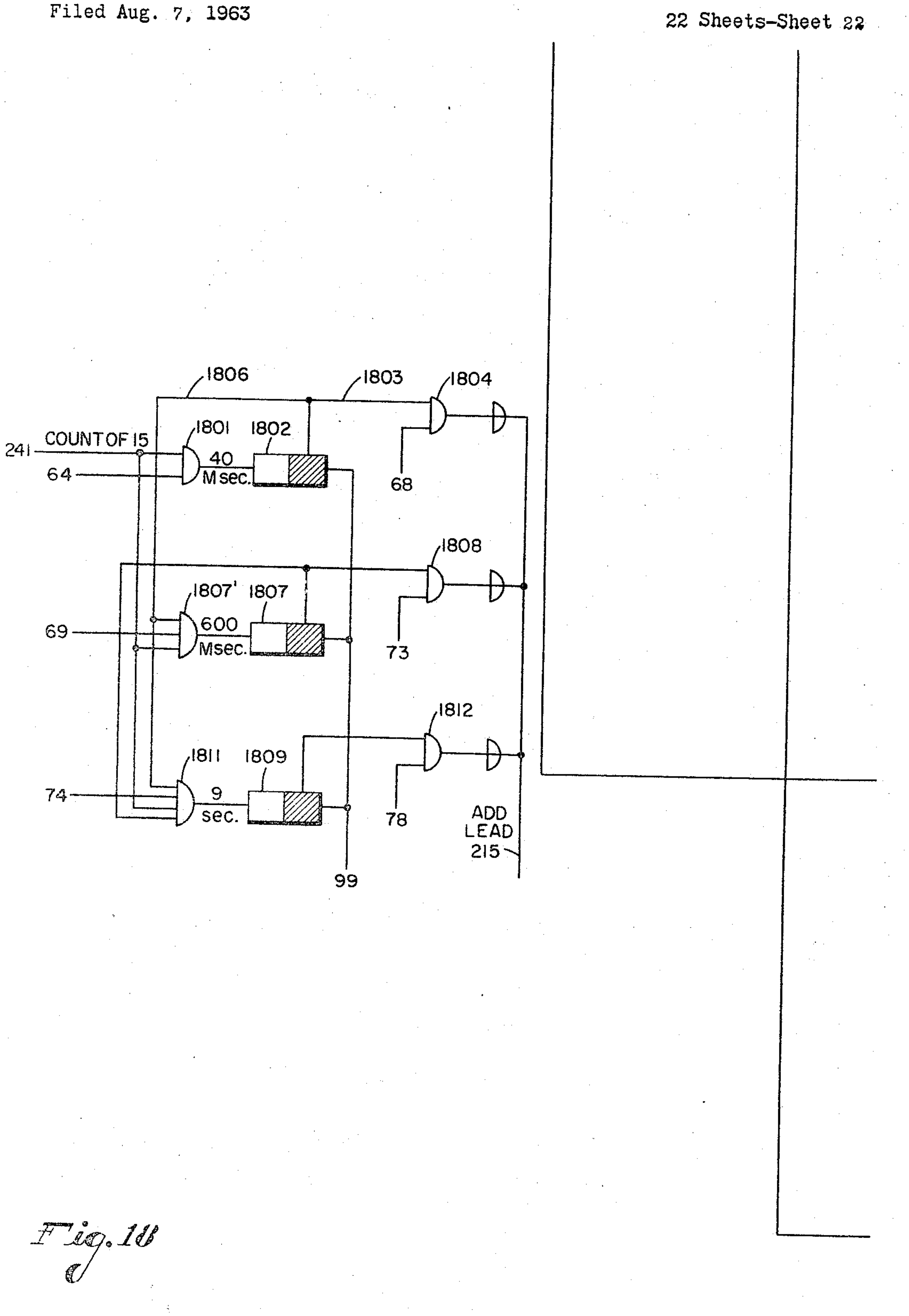

For a better understanding of the invention, reference may be had to the accompanying drawings in which:

FIG. 1A discloses a schematic diagram which may be useful in the understanding of the overall operation of the system;

FIG. 1B discloses the make-up of a single recirculating cell;

FIG. 2 discloses a portion of the recirculation loop including the half-adder bank and the buffer store;

FIG. 3 discloses a portion of the recirculation loop including subtraction circuitry;

FIG. 4 discloses a portion of the recirculation loop including the main delay line store together with read-in circuitry;

FIG. 5 discloses a portion of an ancillary recirculation path for the recirculation loop including the start-of-cell signal generator;

FIG. 6 discloses the timing bit generator together with circuitry for clearing particular cells;

FIG. 7 discloses time division multiplex circuitry for sequentially coupling the dial pulse acceptors to the inpulsing and outpulsing buses;

FIG. 8A discloses various control circuits including circuitry for detecting the on-off hook states of the inpulsing bus;

FIG. 8B discloses steering circuitry for controlling the insertion of dialed digits into the various digit stores recirculating within the main delay line store;

FIG. 9 discloses control circuitry for altering the count rate of the impulse analyzer counter;

FIG. 10 discloses processor control circuitry for controlling access times of the translator and processor stores;

FIG. 11A discloses the digits sent store together with control circuitry for controlling spill-out of dialed digits into the outgoing digit store;

FIG. 11B discloses the outgoing digit store together with ancillary control circuitry;

FIG. 12A discloses a first portion of the translator;

FIG. 12B discloses a second portion of the translator;

FIG. 13 discloses outpulsing circuitry;

FIG. 14 discloses miscellaneous control circuitry;

FIG. 15 discloses a pulse diagram which will be helpful in the understanding of the manner in which the processor is accessed to the various recirculating cells;

FIGS. 16 and 17A disclose pulse diagrams which are helpful in the understanding of the outpulsing process;

FIG. 17B discloses circuitry for writing in a binary thirteen into the digits sent store;

FIG. 18 discloses carry circuitry for the various timing counters;

FIG. 19 discloses a memory circuit which is utilized to clear a particular cell upon the manifestation of a twenty-seven-second time-out condition; and FIG. 20 discloses a diagram which is helpful in placing most of the aforementioned figures together in a meaningful physical pattern.

*Overall systems operation*

Three-digit numbers will be employed in the specification to identify components, the first digit or first and second digits signifying the figure in which each is found. Two-digit numbers beside a conductor indicate that a timing bit is applied to that conductor every one-hundred microseconds during the subinterval identified by the number.

FIG. 1A schematically discloses twenty-five dial pulse acceptors 101 (710 in FIG. 7) having outgoing and incoming terminals, a distributor 102 (712) which sequentially couples each dial pulse acceptor 101 to the recirculation loop which comprises main delay line store 103 (410 in FIG. 4) and buffer store 104 (212), among other things.

In the particular embodiment of the present invention, twenty-five recirculating cells (registers) are present in the recirculation loop, each cell containing one-hundred subcells, as shown in FIG. 1B. The digits transmitted from each dial pulse acceptor will be sequentially inserted into digit stores (subcells 23–56) contained within its associated recirculating cell. Control circuitry is provided for stepping distributor 102 so that each and every dial pulse acceptor inserts information into (inpulsing) and receives information from (outpulsing) its particular associated cell. Each recirculating cell also contains a digits sent store, an outgoing digit store, various counters, and a number of other control sections, all of which will be explained in detail hereinafter. Buffer store 104 is utilized primarily to forward recirculating data to the processor, examine the information recirculating in the loop so that various control functions may be carried out, and for changing the binary content of various recirculating subcells. Processor 106 is provided, which is time shared by all twenty-five recirculating cells, and is utilized to carry out the translation and outpulsing functions, which will be described in detail hereinafter.

The specific embodiment of the present invention will receive a seven-digit numerical type impulse train (XYZ–QRST) which is representative of a dialed telephone number and will translate the first three digits into six routing digits (ABCDEF) in translator 107 (FIGS. 12A and 12B). Each of the six translated routing digits are sequentially inserted into outgoing digit store 108 (1004) and are sequentially outpulsed by outpulsing circuitry 109 (FIG. 13) and transmitted to the proper dial pulse acceptor 101. The incoming numerical type dial pulse trains are converted into binary equivalents upon insertion into the main delay line store 103. These numbers are processed in processor 106 and remain in binary form until they are reconverted into uniformly reconstructed numerical pulse type dial impulse trains by outpulsing circuitry 109. Since outpulsing circuitry 109 is coupled to distributor 102, it is evident that the dial pulse acceptors will also receive numerical pulse type information from the multiple register sender to be forwarded to step-by-step switching equipment. Digits sent store 111 (1106) keeps track of how many digits have been outpulsed to perform various control functions, such as controlling the translation process. When the six routing digits, which result from the translation of the first three dialed digits registered in the main delay line store, have been sequentially outpulsed, digits sent store 111 will commence to control spill-out control circuitry 112 (FIG. 11A) which thereafter commences to sequentially insert the spilled out dialed numbers contained within the digit stores of the recirculating cells into the outgoing digit store. Outpulsing of these spilled out digits is sequentially carried out by outpulsing circuitry 109, as in the case of routing digits previously sequentially inserted into the outgoing digit store by translator 107.

Basically, the operation of the specific embodiment of the multiple register sender disclosed herein can be broken down for the purposes of analysis into inpulsing, processing, outpulsing, and clearing. General descriptions of each of these operations will be found hereinafter under each heading.

*Inpulsing*

The multiple register sender of the present invention includes a recirculation loop having a total recirculation time of 2.5 milliseconds or twenty-five-hundred microseconds. The recirculation loop comprises the following tandemly connected elements: a main delay line store 410, a readout shift register 210, a half-adder bank 213, a buffer store 212, and a read-in shift register 412. The read-in and readout shift registers are stepped each microsecond so that each of twenty-five-hundred subcells or twenty-five cells (comprising one-hundred subcells) make the complete trip through the recirculation loop every twenty-five-hundred microseconds or 2.5 milliseconds. One-hundred subcells make up one cell, and accordingly, there are twenty-five cells recirculating in the recirculation loop.

In the embodiment of the present invention disclosed herein, twenty-five dial pulse acceptors are schematically disclosed. For the purpose of the present invention, these dial pulse acceptors may be regarded as sources of information which serially transmit the dialed telephone number to the multiple register sender. These telephone numbers, after being read into the multiple register sender, are processed so that the first three numbers may be translated into routing numbers, as mentioned hereinabove. Therefore, the recirculation loop may be viewed as twenty-five cells or registers, each containing the one-hundred subcells shown in FIG. 1B, which should be continually referred to during the reading of the entire specification. The movement of these twenty-five cells or registers through the recirculation loop is synchronized with the sequential coupling of each of the twenty-five dial pulse acceptors to the various common buses of the multiple register sender by virtue of a dial pulse acceptor distributor. This distributor is directly controlled by start-of-cell and start-of-frame markings which are permanently written into each recirculating cell. When the first cell emerges from the 2491-microsecond delay line and is stepped into the readout shift register 210, a start-of-frame signal is transmitted to the dial pulse acceptor distributor 712 together with a start-of-cell signal which causes the first dial pulse acceptor to be coupled to the common buses. As the second cell emerges from the 2491-microsecond delay line and after the first few subcells are inserted into readout shift register 210, a second start-of-cell signal is produced which causes the dial pulse acceptor distributor 712 to be stepped, thereby to decouple the first dial pulse acceptor and to couple the second dial pulse acceptor to the common buses of the multiple register sender. The remaining dial pulse acceptors are sequentially coupled to their associated cells so that impulse information may be read in, retained, and read out of the cells back into the appropriate acceptor. The various groups of subcells within each cell are schematically disclosed in FIG. 1B. These groups of subcells may be regarded as subregisters for retaining binary bits which are continually being altered, and which are a function of data being produced by associated dial pulse acceptors and by the processor.

A first digit store (subcells 23–26) is utilized to store information relative to the first dialed digit (first pulse train) which is transmitted from a particular dial pulse acceptor into its associated cell. If the first dialed digit (first pulse train) is a five, for instance, the binary number five will be built up within the first digit store (subcells 23–26). If the second dialed digit (second pulse train) is a two, a binary two will be built up and stored within the second digit store (subcells 28–31). Subsequent digits will be inserted into the remaining digit stores or subregisters up to and including the seventh digit store (subcells 53–56). Various logic circuitry within the multiple register sender operates in conjunction with the implse analyzer counter (subcells 8–11), the forty-millisecond counter (subcells 63–66), and control bits which may be contained within control subcells 6, 7, 11 and 14 to carry out these functions. The first received impulse produced by the first dial pulse acceptor causes a count-of-two condition to be built up within the impulse analyzer counter which, in effect, informs the multiple register sender that this is, in fact, a true dialed impulse and not a noise impulse. This causes the registration of a one within the first digit store (subcells 23–26). A second dialed impulse of the first pulse train will again cause a count-of-two condition to be manifested and will cause the binary number within the first digit store to be increased from one to two. Therefore, if the first dialed digit is a five (five impulses), the binary number five will be built up within the first digit store. If a two-hundred-and-five millisecond period elapses between the last impulse registered in the first digit store, a count of one is inserted into the impulse steering distributor counter (subcells 18–20). This causes a steering circuit to be stepped so that the next received impulse is not registered in the first digit store (subcells 23–26) but is inserted into the second digit store (subcells 28–31). Accordingly, if the second dialed digit is a two, the binary number two will be manifested in the second digit store and an interdigital pause of two-hundred-and-five milliseconds is again detected by the logic circuitry of the multiple register sender and the count in the impulse steering distributor counter is again increased by one so that the reception of the next dialed impulse is registered in the third digit store, etc.

Since the recycling time is 2.5 milliseconds, the process of detection of an impulse, together with building up the binary numbers in the digit stores (of a particular cell associated with its acceptor) representing dialed digits, occurs over a period representing many recirculations. As each dial pulse acceptor is coupled to its associated cell every 2.5 milliseconds, it follows that the multiple register sender can simultaneously accept and register twenty-five seven-digit dialed numbers produced by the twenty-five acceptors in twenty or thirty seconds.

The circuitry disclosed in FIGS. 2, 3 and 4 includes a primary recirculation loop which comprises a delay line 410, readout shift register 210, readout AND gates 211, half-adder bank 213, buffer store 212, read-in AND gates 411, and read-in shift register 412. Delay line 410 has an output lead 413 which is coupled to the input circuit of register 210. On the application of a mark to lead 214 during various subcells or intervals within each cell, the binary number present within the first four stages of readout shift register 210 is applied to half-adder bank 213. A mark may be applied to add-conductor 215 at this time which increases the binary number passing through the half-adder bank by one. This binary number, whether altered or unaltered, is applied to buffer store 212, which thereafter stores the number for a certain number of subcells or subintervals. Upon the application of a mark to conductor 414, read-in AND gates 411 are enabled so as to read the aforementioned binary number out of buffer store 212 and into the three stages of shift register 412, and, in the case of least significant digit, directly into delay line 410 through AND gate 416.

It should be noted that the total recirculation time of any bit within a particular subcell is twenty-five-hundred microseconds. Let it be assumed that a bit has just been inserted into delay line 410 by virtue of AND gate 416. This bit will emerge from the delay line and will be applied to the sixth stage 217 of the register 210 over lead 413 two-thousand-four-hundred and ninety-one microseconds later. This bit thereafter is stepped through readout shift register 210 and will be read out from the first stage 216 of the register six microseconds after the bit is fed into the aforementioned sixth stage 217. The bit is stored in the first stage 218 of buffer store 212 for three microseconds and is read out of stage 218 immediately thereafter, whereupon it passes through AND gate 417, OR gate 418, and AND gate 416.

It should be observed that a succeeding bit applied to delay line 410 in the subcell adjacent the subcell containing the aforementioned bit will be inserted into the second stage 219 of the buffer store 212 and will be stored in stage 219, while the first bit discussed in the previous paragraph is stored in the first stage 218 of buffer store 212. When the first bit stored in stage 218 is directly read back into delay line 410, as explained hereinbefore, the second bit stored in the second stage 219 will pass through AND gate 418 and OR gate 419 to be inserted into the first stage 421 of read-in shift register 412. One microsecond thereafter, this second bit passes through AND gate 422, OR gate 418, and AND gate 416, thereby to be reinserted into delay line 410. It should be noted that the total recirculation time of the second bit is also twenty-five hundred microseconds. In other words, although the second bit was inserted in delay line 410 one microsecond after the insertion of the first bit, the second bit will be read out of the buffer store 212 simultaneously with the read out of the first bit. However, due to the fact that the second bit is inserted into the first stage of shift register 412, this bit will be reinserted into delay line 410 one microsecond after the insertion of the first bit which is applied directly to the delay line 410. Accordingly, it should be apparent that the recirculating bits are read into the delay line in the same order that they are read out of the delay line, and that the delay time of any bit in any subcell is equal to twenty-five hundred microseconds.

As set forth in the general description, the recirculation loop basically includes twenty-five registers which serve twenty-five dial pulse acceptors, each of these twenty-five registers consisting of one-hundred one microsecond subcells. As may be observed from an inspection of FIG. 1B, the words which represent various information associated with processed calls are made up of four subcells. For instance, the binary word (subcells 23–26) representing the count of the number of impulses (numerical type pulse train) received by the multiple register sender to represent the first dialed digit being emitted by a particular dial pulse acceptor is stored in the first four stages of readout shift register 210. The transfer of this binary word from the readout shift register 210 into the buffer store 212 occurs upon the application of the trailing edge of control bit 23 which is applied to AND gates 211 over lead 214 during subinterval 23. This word, whether altered or unaltered, by the half-adder bank is inserted into buffer store 212. The word remains in buffer store 212 for three microseconds and is read out of the store upon the application of the trailing edge of control bit 26 during the twenty-sixth subinterval.

Referring now to FIG. 7, twenty-five dial pulse acceptors 710 are schematically disclosed coupled to impulsing bus 711, which will also be referred to as the on-off hook bus. For the purpose of the present disclosure, dial pulse acceptors 710 may be considered as sources of trains of impulses which have been registered within the dial pulse acceptors 710 and which represent dial pulse information dialed by various subscribers. Dial pulse acceptor distributor 712 may comprise a chain counter or any other well known device for sequentially producing mark signals on the twenty-five enabling leads, each of which is coupled to an associated dial pulse acceptor. In other words, the dial pulse acceptor distributor 712 sequentially couples the dial pulse acceptors to the impulsing bus 711 so that the impulsing bus is time shared with respect to dial pulse acceptors 710.

FIG. 1B schematically discloses one hundred subcells which make up one of twenty-five cells each of which recirculates in the recirculation loop every 2.5 milliseconds. The dial pulse acceptor distributor 712 is stepped every one hundred microseconds so that each of the twenty-five dial pulse acceptors is coupled to its associated cell which is recirculating in the recirculation loop. As a result, the impulses impressed upon on-off hook bus 711 which are emitted by the second dial pulse acceptor 713 will be registered only in the second cell.

As shown in FIG. 1B, it may be observed that each cell is marked in subcells 1–4. In addition, a mark is also present in the one-hundredth subcell of the prior cell. This condition is true for all cells recirculating in the register. However, a mark is only present in the fifth subcell at the start of the frame or, in other words, if the cell to be read out of delay line 410 is, in fact, the first cell. These start-of-cell and start-of-frame signals may be read into the recirculation loop by a strobing generator, as is well known in the art.

At the beginning of the frame, subcell 1 is stored in flip-flop 216 of readout shift register 210, subcell 2 is stored in flip-flop 221, subcell 3 is stored in flip-flop 222, and subcell 4 is stored in flip-flop 223. At this time, a mark is present in the one-hundredth subcell of the twenty-fifth cell, which means that this mark is stored in flip-flop 423 which comprises a portion of read-in shift register 412. This mark is impressed upon conductor 424 and is applied to input terminal 510 of AND gate 511. The marks present in the first four subcells cause the remaining four input terminals of AND gate 511 also to be marked so that a mark is applied to AND gate 512, which mark indicates that a start-of-cell condition is present. It should be noted that this condition is unique for each cell. The start-of-cell condition which is produced at the output terminal of AND gate 511 passes through AND gate 512 during subcell 1 to be impressed upon start-of-cell conductor 513, which conductor is connected to the stepping circuit of dial pulse acceptor distributor 712. Accordingly, the unique start-of-cell signal causes the distributor 712 to be stepped every one-hundred microseconds, thereby to associate each dial pulse acceptor 710 with its associated recirculating cell.

Unlike cells 2–24, the first cell will, in addition to a start-of-cell signal, also generate a start-of-frame signal. This is accomplished by coupling the output of flip-flop 226 to a first input terminal of AND gate 228 via lead 229. Start-of-cell conductor 513 is connected to a second input terminal of AND gate 228 so that a start-of-frame mark is impressed upon conductor 230, which conductor is coupled to the dial pulse acceptor distributor reset circuit which, in turn, causes a mark to be produced on the first lead 714 to in turn couple the first dial pulse acceptor to the buses, including on-off hook bus 711. This action insures that distributor 712 is properly synchronized with the recirculating cells within the recirculation loop.

FIG. 6 schematically discloses a timing bit generator which is utilized to control the timing of the various gates within the multiple register sender. This generator may be a chain counter or any other well known high-speed electronic stepping device. The one megacycle clock 611 is coupled to the input circuit of the generator so that the generator is stepped every microsecond. Output leads 612 are numbered to indicate that a mark is produced on each lead once every one-hundred microseconds during a particular subcell. For instance, a mark is produced on lead 613 during the fourth subcell within each cell. If the timing bit generator is a chain counter, the lead 613 would be coupled to the fourth stage of the counter. The timing bit generator may comprise eight tandemly connected flip-flops whose output circuits are coupled to a binary-to-decimal translator matrix. The output leads of the matrix correspond to leads 612. This structure is not disclosed since it forms no part of the present invention and is well known to those skilled in the art of data handling. Conductors 614, 616, 617 and 618 are wired to the aforementioned translator matrix in such a way that marks are produced on the various conductors a number of times during each one-hundred microsecond period in contrast with leads 612. For instance, a mark is produced on conductor 614 during the sixth, eleventh, sixteenth, twenty-first, twenty-sixth, thirty-first, thirty-sixth, forty-first, forty-sixth, fifty-first, fifty-sixth, sixty-first, sixty-sixth, seventy-first, seventy-sixth, eighty-first, eighty-sixth, ninety-first, and ninety-eighth interval within each one-hundred microsecond period. In like manner, numerous marks are produced on conductors 616, 617 and 618 during the subcells as indicated in FIG. 6 and FIG. 1B.

It may be noted at this time that three-digit numbers are utilized in the various figures to designate structure, the use of two-digit numbers indicate that a mark is applied to a particular lead during a particular subinterval. For instance, a one is placed beside the second input terminal of AND gate 512 mentioned hereinbefore in connection with the generation of the start-of-cell signal. This means that a mark is applied to AND gate 512 during the time when the first subcell of each cell is present in the first flip-flop 216 of readout shift register 210, which is every one-hundred microseconds. In other words, the second input terminal of AND gate 512, which bears the number one, is coupled to lead 619 of FIG. 6, which lead is pulsed when the first subcell is present in the first flip-flop 216 of readout shift register 210. This interval is called the first subinterval.

Let it be assumed that all of the information in the multiple register sender has been cleared except, of course, the start-of-cell and the start-of-frame marks which are always present within the multiple register sender. Let it also be assumed that only the first and twenty-fifth dial pulse acceptors have trains of impulses to be fed into the first and twenty-fifth cells, respectively. In the beginning of the frame cycle, dial pulse acceptor distributor 712 is reset by the application of the start-of-frame mark to conductor 230, as explained hereinabove. The start-of-cell mark is also applied to conductor 513 of distributor 712, thereby causing the first dial pulse acceptor 710 to be coupled to on-off hook bus 711. Let it be assumed that a subscriber whose line circuit is associated with dial pulse acceptor 710 has just gone off-hook less than 2.5 milliseconds before the initiation of the new frame. This action causes a mark to be impressed upon on-off hook conductor 711. This mark is applied to the second input terminal of AND gate 426. At subinterval 7, a mark is applied by the timing bit generator of FIG. 6 to the first input terminal of AND gate 426 thereby to produce a mark at the output of AND gate 426, which mark passes through OR gate 427 to set flip-flop 423. This action marks subcell 7, which is the on-off hook subcell, as shown in FIG. 1B. This subcell will remain marked as long as an off-hook mark is present upon on-off hook bus 711.

Why does the setting of flip-flop 423 during subinterval 7 cause the seventh cell to be marked? This may be understood when it is appreciated that during the first subinterval the start-of-cell marks are stored in flip-flops 216, 221, 222 and 223. The start-of-frame mark or the fifth subcell will be stored in flip-flop 226. The cell-in-processing mark will be stored in flip-flop 217. Accordingly, at this time, the on-off hook subcell 7 is about to emerge from delay line 410. One microsecond later, subcell 7 will occupy flip-flop 217, two microseconds later, subcell 7 will occupy flip-flop 226, and six microseconds later, subcell 7 will occupy the flip-flop 216. Seven microseconds later this bit would be inserted into flip-flop 423 if AND gate 433 remained enabled. It should be apparent that the output terminal of AND gate 426 could be connected to the second set terminal of flip-flop 428 and the same result would be effected if a mark was applied to the first input terminal of AND gate 426 at subinterval 8 rather than subinterval 7.

It should be understood at this time that the impulse analyzer counter comprises subcells 8, 9, 10 and 11. Its count, as represented by the binary number contained within the subcells 8, 9, 10 and 11 is controlled as follows:

During the first frame period, lead 910, of FIG. 9, will be marked during subinterval 6. This is because lead 910 is coupled to output terminal 236 of flip-flop 217. Output terminal 236 will be marked where a binary zero is stored in the sixth subcell. At this time, the cell-in-processing subcell will not be marked. Accordingly, AND gate 911 will cause a mark to pass through OR gate 912 to set flip-flop 913, which action in turn causes AND gate 914 to be enabled. During the eight subinterval, AND gate 914 produces a mark on add lead 916 which in turn is coupled to add lead 215. Accordingly, a binary count of one is registered in the impulse analyzer counter. Flip-flop 913 is thereafter reset during subcell 9.

Likewise, during the second frame, a count of two is registered in the impulse analyzer counter. The registration of the count of two in the subcells 8–11 causes a mark to be applied on binary-to-decimal converter output lead 238, which is applied to the second input terminal of AND gate 239. Since the count of the impulse analyzer counter is stored in the buffer store during subinterval 11, a binary one will be inserted into flip-flop 241 of buffer store 212 by virtue of the action of AND gate 239, which causes the marking of the count-of-two subcell 11, shown in FIG. 1B.

During the third frame, a count-of-two mark will be storde in flip-flop 217 during subinterval 9 and, accordingly, since flip-flop 217 is now set, leads 236 and 910 will no longer be marked and, as a result, the timing bit produced at the second input terminal of AND gate 911 during the sixth subinterval will no longer be effective to increase the count of the impulse analyzer counter every frame, as was the case during the first two frames.

A free running forty-millisecond counter is provided, which counter utilizes subcells 63–66, as shown in FIG. 1B. The count in the forty-millisecond counter, which is running all the time, is always increased by one every 2.5 milliseconds or for each frame period. Each counter in each cell contains the same count during a particular frame. This is accomplished by the application of a mark during subinterval 63 to the second input terminal of OR gate 232 or add lead 916. This count (in each cell) is automatically reset upon the sixteenth frame since a binary 1–1–1–1 will be changed to a binary 0–0–0–0 by virtue of the operation of half-adder bank 213. The reason that this counter is called a forty-millisecond counter is that a mark is produced when a binary 1–1–1–1 is contained within the counter (16×2.5). The count-of-fifteen mark is produced on output lead 241 of binary-to-decimal translator 240 every forty milliseconds, which lead is connected to lead 917, of FIG. 9. The impulse analyzer counter may be reset, regardless of the count within the forty-millisecond counter, by the application of a mark to reset counter lead 810 by the operation of level change indicator 811. This lead is connected to reset lead 234 of FIG. 2. Every forty milliseconds the mark produced by the timing bit generator, during subinterval 64, will pass through AND gate 918 to set flip-flop 919 which, in turn, produces a mark at the second input terminal of AND gate 921 to insert a count into the impulse analyzer counter. During the sixth subinterval, the mark produced by AND gate 921 causes flip-flop 913 to become set which, in turn, causes a mark to be applied during subinterval 8 to add lead 916–215, thereby to increase the count within the impulse analyzer counter to the count of three.

To review briefly, a count of one is registered in the impulse analyzer counter during the first frame by virtue of the full enabling of AND gate 911. A count of two is registered in the impulse analyzer counter during the second frame so that the count of two within the impulse analyzer counter indicates the five milliseconds have elapsed. After the off-hook bus 711 has become marked, the registration of a count of two within subcells 8–11 of the impulse analyzer counter causes AND gate 911 to become disenabled. The count is thereafter increased to three only after the passage of forty milliseconds, since the setting of flip-flop 919 is necessary to increase the count further by dint of the operation of flip-flop 913. In other words, the circuitry of FIG. 9 causes the impulse analyzer counter to shift from a 2.5-millisecond count to a forty-millisecond count rate after a count of two. The reason for this will be explained herein in connection with the detection of the end-of-digit condition. It should be appreciated that the count within the impulse analyzer counter is cleared each time a change in the hook condition is indicated by level change indicator 811. As a result of the resetting of the impulse analyzer counter upon the registration of a transient condition (change-of-hook state condition), the impulse analyzer counter will commence to count the time interval of an on-hook or off-hook condition which has newly been manifested on on-off hook bus 711. A level change indicator 811 registers a mark on on-to-off hook conductor 813 when an on-to-off hook transient is produced on impulsing bus 711. Level change indicator 811 produces a mark on conductor 814 when an off-to-on hook transient is produced on impulsing bus 711. Since leads 813 and 814 are coupled to lead 810 through OR gate 816, a mark is produced on lead 810 each time a transient occurs regardless of whether the transient has an on-to-off hook condition or an off-to-on hook condition.

An on-to-off hook condition is detected as follows: as an off-hook condition is manifested on impulsing bus 711, a mark is applied to the second input terminal of AND gate 817. A no-mark condition is applied to the second input terminal of AND gate 818 owing to inverter 822 so that only AND gate 817 is partially enabled. A fresh off-hook condition on impulsing bus 711 implies that the on-to-off hook subcell 7 will be unmarked since an on-hook condition prevailed on impulsing bus 711 during the preceding frame. The state of subcell 7 may be detected during subinterval 9 by connecting output terminal 431 of flip-flop 428 to the first input terminal of AND gate 821, as shown in FIG. 8. Since the impulsing bus 711 manifested an on-hook condition in the preceding frame, a no-mark condition will be present in subcell 7 and, accordingly, a mark will not be produced by AND gate 821 during subcell subinterval 9. However, by virtue of the operation of inverter 822, AND gate 817 causes a mark to be produced on the on-to-off hook conductor 8 which mark is also produced on lead 810. Now let it be assumed that an off-to-on hook transient has just occurred in impulsing bus 711. Under these circumstances, on-to-off hook subcell 7 will be marked and impulsing bus 711 will be unmarked. Accordingly, AND gate 821 produces a mark during subinterval 9 which passes through AND gate 818 which is now enabled by virtue of the action of inverter 822. Since the output terminal of AND gate 818 is connected to the second input terminal of OR gate 816, a transient mark is applied to lead 810.

When an on-to-off hook condition is manifested on impulsing bus 711, a mark is produced on reset lead 810, as explained hereinabove, thereby to reset the impulse analyzer counter.

Two conditions are necessary for the registration of a single dialed impulse. An on-hook to off-hook condition must be manifested together with an indicated count of two emanating from the impulse analyzer counter. Upon the manifestation of the initial off-hook condition, a count of two will not be present in the impulse analyzer since this counter is resetting upon the occurrence of an on-to-off or an off-to-on transient. The first dialed impulse received by the multiple register sender will cause a change in the level of bus 711 from off-hook to on-hook. As stated earlier, if this on-hook condition persists for at least five milliseconds, an impulse will, in face, be registered. If this on-hook condition exists for less than five milliseconds. It is ignored since the impulse is assumed to be due to contact bounce or noise. Therefore, when bus 711 reverts to the on-hook condition after initial off-hook condition and remains on-hook for greater than five milliseconds and then reverts to off-hook again, the registration of a single dialed impulse will be effected. Under these circumstances, a transient level change mark will be produced on conductor 823 as explained hereinbefore. A mark will concomitantly be produced upon output conductor 238 of the binary-to-decimal translator 240 and AND gate 824 will produce a mark to cause impulse-recognition flip-flop 826 to be actuated. The actuation of flip-flop 826 will occur during subinterval 9 since AND gate 817 is fully enabled at this time under these conditions. Flip-flop 826 remains enabled until subinterval 56, at which time it is reset. AND gate 827 is fully enabled during subinterval 14 and the impulse-received subcell 14 is marked. The marking of impulse-received subcell 14 is carried out by causing the output lead 828 of AND gate 827 to be connected to flip-flop 219 of the buffer store through lead 242, OR gate 243, and half-adder 244. The setting of impulse-recognition flip-flop 826, besides causing the marking of the impulse-received subcell 14, also partially enables AND gate 829 until subinterval 56.

The purpose of steering circuit 831 is to initiate or increase the count in the various number counters (subcells 23–57) upon the manifestation of each impulse-recognition signal. In other words, if the first number dialed by a subscriber associated with a particular dial pulse acceptor is five, the five impulse-recognition signals, which cause the setting of flip-flop 826 five times, must be counted in the first digit number store (subcells 23–26). This number five will be present in binary form in buffer store 212 during subintervals 23–26, as shown in FIG. 1B. Digits thereafter dialed by the subscriber and associated with the second dialed number must be inserted and counted in the second digit number store (subcells 28–31). This steering proces is controlled by steering circuit 831 which, in turn, is controlled by the number, including zero, present in the impulse steering distributor counter (subcells 18–20). The number present in the impulse steering distributor counter will be present in binary form in the buffer store during subintervals 18–20, as shown in FIG. 1B. The inputs to the first tier AND gates of steering circuit 831 are connected in various permutations to the output leads of the flip-flop 832, as symbolically indicated in FIG. 8. For instance, the first input terminal of AND gate 848 is connected to the left-hand terminal of flip-flop 834, the second input terminal is connected to the left-hand terminal of flip-flop 835, and the third input terminal is connected to the left-hand output terminal of flip-flop 836. The left-hand terminals of flip-flops 832 will be marked in the reset or binary zero state. On the other hand, the right-hand terminals of these flip-flops will be marked when the flip-flops are set or in the binary one state. These comments apply equally as well to the connections between the binary-to-decimal translator 240 and the flip-flops of the buffer store, discussed hereinbefore. Flip-flops 832 receive and store the binary number present in the impulse steering distributor counter during the nineteenth subinterval by virtue of AND gagtes 837, 841 and 843. The first terminal of the first AND gate 837 is connected to the output terminal of flip-flop 241 over lead 838–246. In like manner, the first input terminal of AND gate 841 is connected to flip-flop 219 of buffer store 212 over conductor 842–247. The first input terminal of AND gate 843 is connected to the output terminal of flip-flop 220 over conductor 846–225. Accordingly, during subinterval 19, the binary number in buffer store 212, which represents the count in the impulse steering distributor counter, will be inserted into flip-flops 832, which are all reset during subinterval 97 over lead 847.

As mentioned hereinbefore, AND gate 829 is partially enabled upon the recognition of an impulse (flip-flop 826 is set). The first dialed impulse will, of course, be associated with the first dialed digit. Therefore, the count of zero is present in the impulse steering distributor counter and none of the flip-flops 832 are set during subinterval 23. Since AND gate 848 will produce a mark where a zero is stored in the impulse steering distributor counter (all input terminals of AND gate 848 are connected to the binary zero terminals of flip-flops 832), a mark will be produced in the output terminal of AND gate 851 during the twenty-third subinterval and will pass through OR gate 852 and partially enabled AND gate 829 and will be inserted into the first digit store, thereby to cause a count of one to be inserted into the first digit store. This is accomplished by connecting the output terminal 853 of AND gate 829 to add lead 215, thereby to set flip-flop 218. The second received impulse will cause a second mark to be produced in the output circuit of AND gate 829 to reset flip-flop 218 and set flip-flop 219 by the action of half-adder 213 to register a binary two. Registration of subsequently received impulses of the first digit continues in like manner.

Now let it be assumed that the particular dial pulse acceptor which is in communication with the multiple register sender finishes transmitting the first digit. An interdigit pause will be detected, thereby to cause a count of one to be inserted into the impulse steering distributor counter. As explained hereinbefore, an off-hook condition of two-hundred-and-five milliseconds or longer is interpreted to be an interdigital pause. It will be remembered that the impulse analyzer counter is reset upon each on-to-off hook, or off-to-on hook transient; therefore, the trailing edge (on-to-off hook transient) of the last dialed impulse of the first digit will clear the impulse analyzer counter so that the stage is set for determining the presence of a two-hundred-and-five millisecond off-hook condition. The count of two indicates the passage of five milliseconds and the registration of the count of seven will indicate the passage of two-hundred-and-five milliseconds since the count rate of the impulse analyzer shifts to the forty-millisecond rate after a count of two, as explained hereinbefore. As the second input terminal of AND gate 856 is connected to the count-of-seven AND gate of binary-to-decimal translator 240 over lead 857–249, a mark will be produced at the output terminal of AND gate 856 during subinterval 9. This mark is forwarded to AND gate 858 which is enabled at this time since impulse-received subcell 14 is marked (subcell 14 is not marked upon initial off-hook). A mark in subcell 14 during the ninth subinterval will cause a mark to be produced on lead 220 of flip-flop 217, which lead is connected to input terminal 855 of AND gate 858. Since the output terminal of AND gate 858 is coupled to the set terminal of end-of-digit flip-flop 861, the mark is produced on end-of-digit conductor 862 and remains on end-of-digit conductor 862 until end-of-digit flip-flop 861 is reset during the fifty-sixth subinterval. During subinterval 18, AND gate 863 is fully enabled, thereby to forward a mark over conductor 864–215 to cause a count of one to be manifested in the impulse steering distributor counter.

Upon the setting of impulse-recognition flip-flop 826 upon receipt of the first impulse of the second digit, AND gate 867 of steering circuit 831 is partially enabled, and AND gate 851, which was previously enabled during the receipt of the first digit, is disenabled owing to the count of one in the impulse steering distributor counter. Accordingly, a mark is produced at the output terminal of AND gate 867 during subinterval 28 and passes through OR gate 852 and partially enabled AND gate 829 to cause a count of one to be inserted into the second digit store, since the subcells comprising this store are present in the buffer store during subinterval 28. The count is increased upon the receipt of each impulse of the second digit until an end-of-digit signal is again detected by AND gate 856, as described hereinbefore. The count in the impulse steering distributor counter is again increased by one and, as a result, AND gate 867 is disenabled and AND gate 869 becomes enabled so that further received digits are inserted into the third digit store. This process continues until all of the dialed digits are inserted into all seven of the digit stores of this embodiment of the present invention. It should be noted that upon the setting of end-of-digit flip-flop 861, AND gate 871 is fully enabled during the fourteenth subinterval to cause the erasure of the impulse-received bit in subcell 14. This is accomplished by connecting the output terminal of AND gate 871 to the reset terminal of flip-flop 219 of buffer store 212 over lead 872–251. In this manner, a new impulse-received bit must be registered in subcell 14, as previously explained, before a subsequent end-of-digit condition can be registered. Without this feature, the off-hook condition would step the steering circuit without further receipt of impulses.

*Processing*

The disclosed embodiment of the present invention receives and remembers a seven-digit number from each dial pulse acceptor 710. The first three digits dialed by the subscribers associated with each dial pulse acceptor could be the exchange number of the called party situated within the same area but located in another city or town. These three digits are fed into the translator, shown in FIGS. 12A and 12B. The translator translates these three digits into six routing digits which are sequentially outpulsed to set up an intra-area route. After these six digits have been sequentially outpulsed, to set up the route, the seven digits dialed by subscribers associated with dial pulse acceptors 710 are utilized to actuate switching circuitry at the called exchange to finally complete the call. If the multiple register sender were utilized for inter-area traffic, a ten-digit store would be provided to accommodate the area code which could be translated into a series of routing digits. As discussed hereinbefore, the digits dialed by the subscribers are represented by numerical pulse type trains, as produced by standard present-day dial telephones. These numerical pulse trains are translated into binary numbers which are sequentially built up within seven digit stores comprising subcells 28–56 of each recirculating cell. Since there are only one processing store and one translator, the recirculating cells are sequentially accessed to the translator so that the first three digits dialed into the multiple register sender and contained within the first three digit stores are transferred out of the particular cell accessed to the translator and are inserted into binary stores within the translator. The three four-bit stores are utilized to select or enable one out of one-thousand route cards within the translator. The route cards together with a decimal-to-binary converter and a stepping circuit are physically arranged to provide for the encoding of the six-digit number. Each one of the six translated routing digits are inserted sequentially into an outgoing digit store which is electrically associated or accessed with subcells 93–98 of each cell. See FIG. 1A.

After the six routing digits associated with a particular recirculating cell are sequentially outpulsed, as will be explained hereinafter under "Outpulsing," the digits sent store, which is accessed to subcells 58–61, will cause spill-out to occur. Before outpulsing commences, the digits sent store within each recirculating cell is set at the number thirteen in this particular embodiment of the present invention since thirteen digits are to be transmitted by the multiple register sender back through associated dial pulse acceptors (six routing digits plus seven conventional numbers for selecting the subscriber at a particular exchange). When the first of six routing digits encoded in the translator is inserted into the outgoing digit store in binary form, the stage is set for the outpulsing of this first routing digit. As each impulse of this first routing digit is reconstructed by the outpulsing circuitry of FIG. 13 and transmitted to the appropriate dial pulse acceptor, the binary number contained within the outgoing digit store is reduced by one so that, after a time, the count within the outgoing digit store reaches zero. This, of course, will only occur after numerous recirculations of the particular cell. When the count in the outgoing digit store reaches zero, the binary thirteen contained within the digits sent store is reduced to a binary twelve. This action causes the count, which will be inserted in the route card steer store of the translator (FIG. 12B), to be reduced from seven to six, which sets the stage within the translator for the encoding of the second routing digit. See FIG. 17A. This second routing digit is inserted in binary form into the outgoing digit store and outpulsing of the second routing digit is carried out. Outpulsing of the third, fourth, fifth, and sixth routing digits is thereafter accomplished until a count of seven is registered in the digits sent store. The registration of a count of seven in the digits sent store prevents the remaining digits from obtaining access to the translator since the translator is no longer required as routing has already been set up. The remaining seven digits are sequentially spilled out, or sequentially inserted, into the outgoing single digit store where the outpulsing of these digits is carried out without translation. In other words, after the sixth routing digit is outpulsed, the binary number contained within the first digit store (subcells 23–26) is inserted into the outgoing digit store (subcells 93–96) by virtue of logic circuitry associated with the digits sent store. The first digit is outpulsed and, when a count of zero is registered in the outgoing digit store to indicate that the first digit stored within the first digit store is completely outpulsed, the count within the digits sent store is reduced from seven to six. This action causes the binary number stored within the second digit store (subcells 28–31) to be spilled out into the digits sent store so that the second digit may be outpulsed. After the second digit is fully outpulsed, the count within the digits sent store is again reduced by one and this action causes spill-out of the third digit. All digits are thereafter spilled out until the seventh digit is outpulsed, at which time the particular cell is cleared or erased so that this cell may be utilized to again handle a fresh call.

In order to perform the aforementioned operations swiftly and in an economical manner, the processor, which is disclosed in FIGS. 10, 11A, 11B, 12A and 12B and which includes the digits sent store, the outgoing digit store, and the translator, is sequentially accessed to each of the twenty-five recirculating cells. Each recirculating cell contains certain subcells which enable and control access of each recirculating cell to the common processor at various times to carry out translation and outpulsing.

Each recirculating cell, the contents of which represent information transmitted from associated dial pulse acceptors, is sequentially accessed to the processor every 62.5 milliseconds. It will be recalled that a single recirculation of each cell within the multiple register sender takes 2.5 milliseconds. After a particular cell, such as the second cell, is accessed to the translator so that read-in of information contained within the cell occurs, the processor bit 6, which is the cell-in-processing bit, is marked. The other recirultaing cells do not have bit 6 marked. Cell-in-processing bit 6 earmarks the cell so that no other cell may gain access to the processor. In FIG. 15, marking of bit 6 together with the transfer of information from cell 2 into the processor is schematically indicated. This earmarks cell 2 so that only cell 2 may be accessed to the processor. During the next frame, bit 6 is recognized by the processor and read out from the processor back into the second cell is accomplished. The processor has, therefore, been associated with cell 2 for one frame period, or a period of 2.5 milliseconds. Bit 6 is erased from cell 2 at this time and cell-in-processing subcell 6 of cell 3 is marked. At this time, information contained within cell 3 is read into the processor. 2.5 milliseconds thereafter, information read into the processor is read back into cell 3 and the bit within cell-in-processing subcell 6 is erased and the cell-in-processing subcell of cell 4 is marked. As a result, a "jump counter" or distributor arrangement is provided for sequentially transferring information from each recirculating cell and returning that information back 2.5 milliseconds thereafter while accessing the next cell. Since there are twenty-five recirculating cells and each cell is accessed to the processor for 2.5 milliseconds, it follows that each cell is accessed to the processor every 62.5 milliseconds ($2.5 \times 25$).

If a particular cell has been accessed to the translator so that the first three digits are inserted into the address stores within the translator, subcell 15, the cell-in-translator subcell, is marked. This earmarks subcell 15 in a similar manner as cell-in-processing bit 6 earmarks the cell accessed to the processor. Upon subsequent recognition of the marked cell in translator subcell 15, a translated routing number is read out of the translator and reinserted back into the cell and outpulsed. The cell-in-translator subcell 15 has been marked and the translator is cleared so that it may be accessed to another cell which carries a request-for-translation bit in subcell 21. Since the translator cannot be accessed to a particular cell unless the processor is concomitantly accessed to this cell, it follows that if only one cell contains a request for translation, then the translator is accessed to this cell every 62.5 milliseconds, just as the processor is accessed to this cell every 62.5 milliseconds. However, should two cells carry a request for translation, the translator would be accessed to each cell every one-hundred-and-twenty-five milliseconds because the second cell would be accessed to the translator before the first cell which has been accessed is reaccessed. In other words, access of particular recirculating cells to the translator is based on traffic and is not accessed to the translator every 62.5 milliseconds, as in the case of the processor. Therefore, if many recirculating subcells request translation, access to the translator may take as much as 15,625 seconds (62.5×25). However, this is not in the least detrimental since, in order for the translator to become effective to encode the first routing digit, the first three dialed digits must first be registered in the multiple register sender and this generally takes several seconds.

Let it be assumed that the cell-in-processing bit 6 of the first cell is marked as disclosed in FIG. 15. When the first cell has arrived at the buffer store, a mark will be produced at the output terminal of flip-flop 216, of FIG. 2, during subinterval 6 to denote that bit 6 of the first cell has been marked. This mark passes through AND gate 1008, of FIG. 10, during subinterval 6 and causes processor transfer enable flip-flop 1001 to become set. At this time, a mark is forwarded over lead 1008′ to cause flip-flop 218 to become reset, thereby erasing bit 6 from cell 1. The setting of flip-flop 1001 also sets the stage for marking cell-in-processing bit 6 in cell 2 when cell 2 arrives at the buffer store one-hundred microseconds later. At this time, timing bit 6 applied to lead 1008″ passes through AND gate 1006, which is enabled by the prior setting of flip-flop 1001, and sets flip-flop 216 to mark subcell 6 in cell 2. Timing bit 6 also resets flip-flop 1001 for one-hundred microseconds at this time via lead 1008‴. This produces the above-described jump counter effect.

As mentioned hereinabove, when the first cell emerges from the main delay line store, processor transfer enable flip-flop 1001 is set and remains set for one-hundred microseconds until terminal 1008″ is again marked by timing bit 6. The marking of lead 1001′ partially enables readout AND gates 1107 and 1118, of FIG. 11A, so that binary information stored within digits sent store 1106 and outgoing digit store 1104 is reinserted into cell 1. See FIG. 15. At subinterval 56, flip-flop 1119 is set by timing bit 56 so that readout AND gates 1118 are fully enabled to transfer the binary digits contained within the digits sent store through OR gates 1117, OR gates 310, half-adder 320, AND gates 330, and OR gates 418, 419, 420 and 427 back into read-in shift register 412. This transfer will actually occur during subinterval 61, as AND gate 340 is coupled to lead 618 of the timing bit generator. Therefore, a binary number contained within digits sent store 1106 of the processor is reinserted into the digits sent store of cell 1 which is contained within subcells 58–61, as shown in FIG. 1B.

At subinterval 64, flip-flop 1119 is reset, thereby to disenable AND gates 1118 and to re-enable AND gates 1107. Accordingly, when AND gates 330 are re-enabled during subinterval 96, the binary number stored within outgoing digit store 1104 passes through AND gates 1107, OR gates 1117, OR gates 310, half-adder 320, and AND gates 330 to be reinserted into read-in shift register 412 so that the contents of the outgoing digit store 1104 is reinserted into the outgoing digit store of the first cell, which outgoing digit store is contained within subcells 93–97, as shown in FIG. 1B.

During the aforementioned period when information is being read out of the processor and read back into recirculating cell 1, processor free flip-flop 1102 has been set by prior timing bits 96 so that processor free conductor 1002′ is unmarked and, accordingly, the read in of information from cell 1 into the processor is not possible since the various read-in gates (1110, 1121, 1124) are disenabled. At subinterval 99, just after read out from the processor into cell 1 has been accomplished, a mark is produced by AND gate 1107 (1001′ is marked) to cause clear-processor bus 1107′ to be marked, which causes the flip-flops within digits sent store 1106 and outgoing single digit store 1104 to be reset to clear these stores. In addition, flip-flop 1104, flip-flop 1103, and flip-flop 1102 are set and flip-flop 1116 becomes reset. Processor-free flip-flop 1102 is set so that processor-free conductor 1102′ becomes marked and remains marked for the next ninety-seven milliseconds, which will be the period when information is read into the processor from cell 2, as will be explained hereinafter. During succeeding subinterval 59, AND gate 1110 is enabled to enable readout conductor 1110′, thereby to enable read-in AND gates 1121. Since the contents of the digits sent store of the second cell (subcells 58–61) are present within the buffer store 212 during subinterval 59, the contents of the digits sent store are read into the digits sent store 1106 of the processor at this time. The enabling of the processor-free conductor 1002′ also causes gate 1124 to be partially enabled so that the binary number contained within subcells 93–96 is inserted into outgoing digit store 1104 during subinterval 94. One frame period later, bit 6, which has been written into cell-in-processing subcell 6, causes the read out of cell 2 back into the delay line and cell 3 is accessed to the processor, as explained hereinabove in connection with the accessing of cell 2 to the processor.

As mentioned hereinabove, the first three dialed digits contained within any of the recirculating cells are sequentially inserted into the translator and are translated into six routing digits which are sequentially outpulsed to the appropriate dial pulse acceptor to set up a given intra-area long distance route. The stage is set for the translation process by writing in a bit in the request-for-translation subcell 21. OR gate 873 is coupled to the first, second, and third AND gates of steering circuit 831, as shown in FIG. 8B. The output terminal of OR gate 873 is connected to the first input terminal of translation-request AND gate 872. The actuation of end-of-digit flip-flop 861 further enables AND gate 872 so that, at subinterval 19, a mark is forwarded by translation-request AND gate 872 to lead 255 of the buffer store thereby to set flip-flop 241 which, in turn, causes request-for-translation bit 21 to be written into subcell 21. The mark produced by OR gate 873 is also utilized to enable AND gate 716, which sets the stage for parallel outpulsing of the first three dialed digits, as will be explained in detail hereinafter.

If the processor is free and, therefore, access to the translator is possible, the first input terminal of AND gate 1011 will be marked at subinterval 19. The request-for-translation bit 21 just written into subcell 21 will cause request-for-translation flip-flop 1004 to become set, which action marks the request-for-translation bus 1005. Two microseconds later, a mark passes through AND gate 1005′, during subinterval 21, and causes the resetting of buffer store flip-flop 218, thereby to erase the request-for-translation bit in subcell 21. The request-for-translation bus 1005 is connected to the third input terminal of AND gates 1202, 1204, and 1204. These AND gates are utilized to control the transfer of the binary digits in the first three digit stores (dialed digits) into binary stores 1215 of the translator. The translation-request bus is also coupled to AND gate 1211 to partially enable AND gates 1212 which cause the binary number stored in the digits sent store to be inserted into the route card steering circuit. If the translator is, in fact, free, flip-flop 1206 will be set to cause translator-free bus 1206′ to be marked. The marking of translator-free bus 1206′ further enables translator read-in AND gates 1202, 1203 and 1204. These AND gates are also partially enabled by binary eight lead 1105′ which is connected to digits sent store 1106.

As shown in FIG. 17A, a bit will be stored in the binary eight flip-flop of the digits sent store as long as the encoded routing digits are being outpulsed. As soon as the count of seven is registered in the digits sent store, that is, as soon as the first six routing digits have been outpulsed, a "not-eight" condition will be manifested in the digits sent store so that a mark is no longer present on binary eight conductor 1105′, thereby to prevent further translation to take place. Translator read-in AND gates 1202 and 1204 are now fully enabled by a translation-request condition, a binary eight condition, and a translator-free condition so that the first dialed digit, the second dialed digit, and the third dialed digit are sequentially inserted into flip-flops 1215 of the translator during subintervals 24, 29 and 34, respectively. As is obvious in the drawing, this is accomplished by sequentially enabling the three groups of AND gates 1214, shown in FIG. 12A, which couple buffer store 212 to flip-flops 1215 via OR gates 310. Flip-flops 1215′ are coupled to a first digit translation tree 1219. The output terminals of flip-flops 1215″ are coupled to tree 1221 and the output terminals of flip-flops 1215‴ are coupled to tree 1222. These trees could be conventional relay trees which are utilized to mark one of ten output leads depending upon the binary address submitted to the tree. Of course, any type of binary-to-decimal converter could be utilized in place of trees 1219, 1221 and 1222. A "three-dimensional" matrix 1220 is connected to the output terminals of the three trees. Since there are ten possibilities in the X-address, ten possibilities in the Y-address, and ten possibilities in the Z-address, it follows that the three-dimensional matrix 1220 provides for one-thousand cross-points which are selected in accordance with the three-digit binary-decimal code (first three dialed digits) inserted into the translator. Such a matrix is disclosed in U.S. Patent No. 3,077,580. A nonlocal call route card 1224 is schematically disclosed in FIG. 12B. Route card 1224 has an enabling bus 1225, which is marked if cross-point conductor 1223 is marked. This action causes AND gates 1229, which are affixed to the route card, to be partially enabled. It should be understood that a particular route card is enabled by the marking of a particular cross-point in the three-dimensional matrix 1220. A local call route card 1233 is shown connected to cross-point 1233′.

Since AND gate 1211 has already been partially enabled by the translator-free condition and by the translation-request condition, the contents of the digits sent store (subcells 58–62) pass through AND gates 1212 upon the production of a mark at the output terminal of AND gate 1211 at subinterval 59, and is inserted into route card steering flip-flops 1213. The output terminals of flip-flops 1213 are coupled to tree 1231 so that the binary number stored within flip-flop 1213 is converted into a decimal equivalent. Since this is the first step in the translation process, the digits sent store will contain the number thirteen so that tree 1231 causes the first AND gate 1229 to be fully enabled. This action, in turn, causes a mark to be forwarded to a particular input lead of decimal-to-binary converter 1226.

It should be understood at this time that one decimal-to-binary converter 1226 may be provided for the one-thousand or less route cards. The mark produced by the first AND gate 1229 is supplied to the uppermost input terminal of decimal-to-binary converter 1226, shown in the drawings. It should be understood that if another route card (not shown) is selected by the marking of a different cross-point, the full enabling of its first or uppermost AND gate will quite possibly cause a mark to be applied to another input terminal of decimal-to-binary converter 1226, such as the fifth input terminal. In other words, each route card has a different scrambling pattern affixed thereto so that various binary numbers (six routing digits) are produced sequentially by the sequential enabling of the AND gates affixed to the route cards by the route card steering circuit, which circuit would be common to the one-thousand route cards.

The request-for-translation condition concurrently present with the translator-free condition and the processor-free condition causes a bit to be written into cell-in-translator subcell 15 just before information is inserted into flip-flops 1215 of the translator. Accordingly, AND gate 1012 is fully enabled during subinterval 18 and a mark is forwarded over conductor 1401 which causes flip-flop 428 of read-in shift register 412 to become set. Sixty-two and one-half microseconds later, when the processor is again accessed to the particular cell which has just received the first three digits to be translated, the cell-in-translator bit written into subcell 15 will cause a mark to be produced in the output terminal of AND gate 1009, thereby to cause this cell-in-translator bit to become erased by virtue of conductor 1009′ (flip-flop 220 becomes reset). At this instant, translator-clear flip-flop 1003 becomes set, thereby to mark translator-clear bus 1003′. This mark is forwarded over conductor 1003′ to partially enable AND gate 1208 in FIG. 12B. Accordingly, during subinterval 74, AND gates 1209 are enabled via AND gate 1208 so that the first translated number, which was previously set up sixty-two and one-half milliseconds previously, passes through OR gates 1103, of FIG. 11B, and is inserted into outgoing digit store 1104. Twenty-two microseconds thereafter, AND gates 330 are enabled during subinterval 96 and the first translated digit is inserted into the outgoing digit store (sub-cells 93–98). The marking of translator-clear bus 1003′ partially enables AND gate 1217. During subinterval 96, flip-flops 1215 are reset and flip-flops 1213 of the route card steer are also reset, thereby to clear the translator. The reset lead coupled to the output terminal AND gate 1217 also causes flip-flop 1206 to change its state so that translator-free bus 1206′ is again marked so that the translator is made available for further translation.

It should be remembered that during the one-hundred microsecond period when the first three digits were read into the translator, flip-flop 1206 was set by virtue of AND gate 1207 so that other data could not be inserted into the translator during the intervening 62.5-millisecond period.

Translator-clear flip-flop 1003 is reset when a mark is applied by AND gate 1107 to the clear-processor bus 1107′ after the translated number is reinserted into the outgoing digit store during subinterval 96.

Accordingly, it should be understood that information is read into the translator, held for 62.5 milliseconds (twenty-five frames), and read out of the translator so that the translator is processing data in a particular cell for a period of 62.5 milliseconds.

*Outpulsing*

After the first translated routing digit is inserted into the outgoing digit store, outpulsing commences. The digits sent store (subcells 58–61) will contain a binary thirteen (as shown in FIG. 17A). After the reconstruction and application of the first impulse to the outpulsing bus, to be explained in detail hereinafter, the count within the outgoing digit store, which represents the first translated routing digit, will be reduced by one. Upon the reconstruction and application of a second impulse to the outpulsing bus, the count within the outgoing digit store will be again reduced by one. When the count within the outgoing digit store reaches zero, the number contained within the digits sent store will be reduced by one. This reduced number is inserted into the group card steering flip-flops 213, as mentioned hereinbefore, to enable the second AND gate 1229 of each route card and, accordingly, the second routing digit is encoded in the same way that the first routing digit was encoded. After all six routing digits are encoded and outpulsed, a count of seven will be present in the digits sent store (subcells 58–62), as indicated in FIG. 17A. A binary "not-eight" condition in this particular cell prevents further information from being fed into the translator, as discussed hereinbefore, and the translator is accordingly out of the picture regarding this particular cell. The seven dialed digits contained within the digit stores (subcells 23–56) are now ready to be outpulsed.

Outpulsing or spill-out of the dialed digits within a particular cell is substantially similar to the outpulsing of translated routing digits. The first dialed digit contained within subcells 23–26 is inserted into the outgoing digit store through a steering circuit, of FIG. 11A, which is not operative when the translated routing numbers emerging from the translator are fed into the outgoing digit store. The first dialed digit inserted into the outgoing digit store is outpulsed in the same way as the translated routing digit. After the count in the outgoing digit store reaches zero, a count is again subtracted from the digits sent store. This action affects the steering circuit so that the second dialed digit contained within subcells 28–31 is inserted into the outgoing digit store to be outpulsed in the same way as the first dialed digit and the preceding six routing digits. Finally, the seventh dialed digit contained within subcells 53–56 is outpulsed after the third through sixth dialed digits, and the particular cell is cleared so that it may handle a fresh call.

FIG. 17B discloses a circuit for causing the binary number thirteen to be inserted into the digits sent store when a particular cell commences to receive dial pulses from its associated dial pulse acceptor. As explained hereinbefore, release register subcell 13 is marked by AND gate 891 upon the manifestation of the first on-to-off hook condition on the impulsing bus. This mark indicates that the cell has been taken up and is retained until it is desired to clear the cell, as explained in detail hereinafter. When a particular cell is to be cleared after outpulsing has been completed or upon the detection of a 27-second time-out condition, or a final on-hook condition, register release bit 13 is erased and remains erased until the cell is again taken up by receiving a first dialed impulse.

Gates 1703, 1704 and 1706 have their output terminals coupled via isolation diodes 1707 to the set terminals of binary eight, binary four, and the binary one flip-flops of buffer store 212 to cause the binary number thirteen to be written into the digits sent store (during subinterval 59) of a particular cell upon the detection of a newly marked release register bit 13 by AND gate 1701. The upper input terminal of AND gate 1701 is coupled to the output terminal 253 of the binary one flip-flop 218 of buffer store 212. Accordingly, during subinterval 13, AND gate 1701 will cause flip-flop 1702 to become set when a marked release register subcell 13 is first detected.

Since the output terminal of flip-flop 1702 is connected to the first input terminals of gates 1703, 1704 and 1706, marks will be produced at the output terminals of each of these gates during subinterval 59, thereby to insert the binary number thirteen into the digits sent store. Conductors 241′, 220′ and 218‴ are, in fact, the set terminals of the buffer store flip-flops. Since the binary number within the digits sent store is continually reduced during processing and is utilized for various control purposes, it is important that the circuitry of FIG. 17B only write the binary number thirteen once into the digits sent store just after release register bit 13 is marked when the cell is taken up. Therefore, it is imperative that no further marks be produced at the output terminals of gates 1703, 1704 and 1706 until bit 13 is erased upon clearance and thereafter rewritten into release register subcell 13. This is insured by the circuitry disclosed in the lower half of FIG. 17B. Flip-flops 1712 and 1712′ are utilized in conjunction with ancillary circuitry for memorizing whether or not bit 13 has already been written into a particular cell. As described hereinabove, marks will be produced at the output terminals of AND gates 1703, 1704 and 1706 during subinterval 59 so as to insert the binary number thirteen into the digits sent store just after bit 13 has been written into a particular cell. Control flip-flop 1712 is associated with the first cell and control flip-flop 1712′ is associated with the twenty-fifth cell. Twenty-three additional control flip-flops (not shown) are also employed to operate in conjunction with the AND gates. Dial pulse acceptor distributor 712 is coupled, as shown, to sequentially enable the various AND gates. As discussed hereinbefore, dial pulse acceptor distributor 712 recycles every 2.5 milliseconds so that one-hundred millisecond marks are sequentially produced on the output leads 714.

Now let it be assumed that a bit has been detected by AND gate 1701 in the thirteenth subcell of the first cell. This action causes a binary thirteen to be inserted into the digits sent store of the first cell, as described hereinabove. In addition, AND gate 1705 causes a mark to be applied to conductor 1707 which, in turn, passes through partially enabled AND gate 1713, thereby to set flip-flop 1712. It should be noted that flip-flop 1712′ will not be set at this time since the lower input terminal of AND gate 1713′ is not marked because only the first output terminal of dial pulse acceptor distributor 712 is marked at this time. As a result of the setting of flip-flop 1712, AND gate 714 becomes fully enabled, thereby to inhibit gates 1703, 1704 and 1706. Until bit 13 is erased from the first cell, flip-flop 1712 will remain set so as to prevent a binary thirteen to become inserted into the buffer store until the cell is cleared and a freshly marked subcell is again detected by AND gate 1701. This is so even though gate 1701 continues forwarding markes to gates 1703, 1704 and 1706.

Now let it be assumed that register release subcell 13 is erased, thereby to clear the cell. At this time, AND gate 1716, which has its upper input terminal connected to the "not" side of flip-flop 218, will cause enabled AND gate 1717 to reset flip-flop 1712 which, in turn, removes the aforementioned inhibit condition from gates 1703, 1704 and 1706. As long as the first cell is not again taken up so that subcell 13 remains unmarked, flip-flop 1702 will not become set. However, once a fresh mark has been inserted into subcell 13, flip-flop 1702 will become actuated, thereby to again cause a binary thirteen to be inserted into the digits sent store. It should be noted that since flip-flop 1712 became reset and has not yet become set by virtue of AND gate 1705, a no-inhibit condition exists and a binary thirteen may be written into the digits sent store. Of course, the aforementioned process is identical for cell 25 which is associated with flip-flop 1712′, and for all intermediate cells associated with similar circuitry, not shown.

Each impulse applied to the outpulsing bus is reconstructed by means of the impulse reconstruction counter (subcells 88–91) together with impulse going subcell 98. FIG. 13 discloses logic circuitry which operates in conjunction with the impulse reconstruction counter and the impulse-going subcell 98 together with the free running forty-millisecond counter (subcells 63–66) and the six-hundred millisecond interdigital pause counter (subcells 68–71). A single reconstructed impulse comprises twenty-four bits, or marks, which are separated from each other by a period of 2.5 milliseconds. This pulse train is integrated before application to step-by-step switching equipment coupled to the associated dial pulse acceptor so that the train, in effect, will register a single count. The impulses making up the pulse train of FIG. 16 are generated by the application of bit 98 to an input terminal of AND gate 1306, FIG. 13, which gate is enabled at particular times when outpulsing is desired. The reconstructed impulses have a pulse width of sixty milliseconds. The time period between impulses within a particular digit is forty milliseconds. Interdigital pauses are, of course, considerably longer. Every twenty milliseconds, an impulse is applied to the impulse reconstruction counter (subcells 88–90). When a count of two is registered in the impulse reconstruction counter, a bit is written into impulse-going cell 98. If the stage is otherwise set for outpulsing, the aforementioned pulse train is generated. When a count of five is detected in the impulse reconstruction counter, this indicates that one-hundred milliseconds has elapsed and impulse-going bit 98 is erased. This process is indicated in FIG. 16.

An impulse reconstruction counter drive for forwarding the twenty-millisecond carry pulse from the forty-millisecond counter into the impulse reconstruction counter is disclosed at the bottom of FIG. 13. AND gate 1321 has a first input terminal connected to output terminal 249 of the binary-to-decimal translator 240. When a count of seven is registered in the forty-millisecond counter, a mark will be produced at the output terminal of AND gate 1321 to set flip-flop 1322. Since the datum point of the counter is taken at a count of fifteen, that is, the count of fifteen represents zero time passage, the count of seven will represent the passage of twenty milliseconds since the counter must first pass through zero before a one is registered therein (2.5 milliseconds times eight equals twenty milliseconds). In this connection it will be recalled that the count in the free running forty-millisecond counter is increased by one during every 2.5-millisecond frame. AND gate 1323 produces an impulse on its output terminal during subinterval 88 and, since the output terminal is connected to add lead 215 of the buffer store, the count within the impulse reconstruction counter will be increased by one every twenty milliseconds. Therefore, it follows that after the passage of forty milliseconds, a mark will be produced at the output terminal of AND gate 1323 which will set flip-flop 1324, thereby to partially enable AND gate 1319. During subinterval 98, a bit will be written into subcell 98. This is accomplished by connecting the output terminal of AND gate 1319 to the set terminal of flip-flop 217. After a count of five is registered in the impulse reconstruction counter, or the passage of one-hundred milliseconds has taken place, a mark will be produced on the output terminal of AND gate 1326, thereby to set flip-flop 1327, which action, in turn, partially enables AND gate 1318. During subinterval 98, a mark is produced in the output terminal of AND gate 1318 and causes a one to be erased from impulse-going subcell 98. This is accomplished by connecting the output terminal of AND gate 1318 to the reset terminal of flip-flop 217. The setting of flip-flop 1327 also partially enables AND gate 1329 which, during interval 89, causes a mark to be applied to the reset bus 250 so as to reset the impulse reconstruction counter. It can now commence to count to two to establish the leading edge of the next impulse.

It should be noted at this time that merely writing in a bit in impulse-going subcell 98 after forty milliseconds and erasing the bit from subcell 98 after the passage of one-hundred milliseconds, does not in and of itself cause pulse trains to be produced on the outpulsing bus, as shown in FIG. 16. The production of these impulses on the outpulsing bus requires the insertion of a binary one into subcell 91, which is designated as the start-sending digit subcell. The marking of subcell 91 indicates that the interdigit period is over. In other words, after a first digit, represented by a plurality of impulses (pulse trains), is outpulsed, it is necessary to provide a six-hundred millisecond interdigit pause so that the step-by-step switching equipment has time to get set to accept the second digit, or differentiate between one digit and the next. Therefore, an end-of-digit condition causes the six-hundred millisecond interdigital position counter to be reset and, after a six-hundred millisecond interval, a bit is written into subcell 91 to enable outpulsing of the subsequent digit.

The six-hundred-millisecond interdigital pause counter is driven by pulses which are produced every forty milliseconds by the forty-millisecond counter. FIG. 18 discloses circuitry for applying carry pulses from one counter to the next. A mark is produced at the output terminal of AND gate 1801 every forty milliseconds. This is because a mark is produced at the upper input terminal of AND gate 1801 upon a count of fifteen within the forty-millisecond counter (sixteen times 2.5 equals forty milliseconds). By enabling AND gate 1801 during subinterval 64, AND gate 1801 will, in effect, be electrically coupled to the forty-millisecond counter. The upper input terminal of AND gate 1801 is coupled to count-of-fifteen output terminal 241 of the binary-to-decimal translator 240. Since the output terminal of AND gate 1801 is coupled to a set terminal of flip-flop 1802 and since its output terminal 1803 is coupled to the upper input terminal of AND gate 1804, it follows that a forty-millisecond carry pulse will pass through AND gate 1804 during subinterval 68 and will be applied to add lead 215 of the buffer store so as to increase the count within the six-hundred millisecond interdigital position counter by one every forty milliseconds. As mentioned hereinbefore, when a count of fifteen has been reached in the six-hundred millisecond counter, a bit is written into start-sending digit subcell 91 so as to further enable the impression of the pulse trains upon the outpulsing bus, as shown in FIG. 16B.

The purpose of AND gate 1311 is to examine the contents of the six-hundred millisecond counter and to produce an output pulse every six-hundred milliseconds; that is, every time a count of fifteen has been accumulated in the six-hundred millisecond counter. This is accomplished by connecting the input terminal of AND gate 1311 to the count-of-fifteen output terminal 241 of the binary-to-decimal translator 240. The production of a mark as the output terminal of AND gate 1311 causes flip-flop 1313 to become set, thereby to partially enable AND gates 1316 and 1317. During subinterval 90, a mark is produced at the output terminal of AND gate 1317, which mark is forwarded to conductor 255 thereby to set flip-flop 241 which, in effect, marks subcell 91. One microsecond later, a mark is produced at the output terminal of read subcell 91 AND gate 1331 so as to set flip-flop 1332 due to subcell 91 being marked. The lower input terminal of AND gate 1331 is connected to output terminal 261 of flip-flop 241. Accordingly, outpulsing AND gate 1306 is partially enabled to set the stage for outpulsing. The setting of flip-flop 1313 also causes a mark to be produced at the output terminal of AND gate 1316. Since AND gate 1316 is set to buffer store reset bus 215, the reconstruction counter (subcells 88–90) is reset to zero, as shown in FIG. 16.

For the time being, let it be assumed that a mark condition is present at the output terminal of inverter 1304 and that flip-flop 1332 is now set owing to the read out of a bit in subcell 91 by flip-flop 1332. Under these conditions, if a bit has been written into subcell 98, these bits will be read by AND gate 1306 and will be impressed upon the outpulsing bus. Since each cell recirculates every 2.5 milliseconds, bit 98 will be impressed on the outpulsing bus, as shown in FIG. 16B.

To recapitulate briefly, the manifestation of a count-of-two condition initiates the pulse train, shown in FIG. 16, providing that inverter 1304 (to be discussed hereinafter) does not inhibit outpulsing and provided that start-sending digit subcell 91 is marked (interdigital period is over). The manifestation of a count-of-five condition causes impulse-going bit 98 to be erased so that the pulse train ceases to be impressed upon the outpulsing bus because the uppermost input terminal of AND gate 1306 is no longer marked. At this instant, it is necessary to subtract one from the count within the outgoing digit store. This is accomplished by the above-mentioned mark condition of inverter 1304, which partially enables AND gate 1336, together with the marked condition at the output terminal of flip-flop 1332. Since a count-of-five condition has just caused flip-flop 1327 to become set, AND gate 1336 is further enabled so that during subinterval 96 a mark is forwarded to subtract-bus 360 of half-adder 320. It should be recalled at this time that the contents of the outgoing digit store will be applied to half-added 320 during subinterval 96 so that subtraction takes place.

The second impulse, disclosed in FIG. 16, is generated in the same manner as the first impulse and, upon cessation of the second impulse upon the manifestation of a count-of-five condition, the count within the outgoing digit store will again be reduced by one so that we are constantly keeping track of the number of impulses which have been impressed upon the outpulsing bus.

Now let it be assumed that the count within the outgoing digit store 1104 reaches the count of one. Accordingly, a mark will be produced at the output terminal of AND gate 1128 and at subinterval 79 a mark will be forwarded by AND gate 1131 to conductor 255' of the buffer store to cause flip-flop 220 to become set. This action causes the marking of subcell 80, which is designated as the (outgoing digit store) "was one" subcell. When the cell under consideration, which has just had its subcell 80 marked, is again accessed to the processor, this "was one" mark is forwarded by conductor 1132 to partially enable AND gate 1109, the function of which is to read "was one" bit 80. The second input terminal of AND gate 1109 is coupled to the processor-free bus so that during subinterval 79 "was one" flip-flop 1116 is set. When the last impulse is outpulsed, a count of zero is manifested in outgoing digit store 1104 and, accordingly, the output terminal of AND gate 1127 is marked to partially enable AND gate 1126. If the "was one" flip-flop is set at this time, a mark is forwarded (twenty-five frames after the setting of "was one" flip-flop) by AND gate 1126 over the end-of-digit bus 1133 to the input terminal of AND gate 370. Since AND gate 370 is further enabled during subinterval 61, it follows that the end-of-digit condition will cause the count within the digits sent store to be reduced by one since the contents of the digits sent store will pass from the buffer store through half-adder 320 during subinterval 61. Therefore, the manifestation of the first end-of-digit condition will cause the count within the digits sent store to be reduced from thirteen to twelve, as indicated in FIG. 17A.

The marking of the output terminal of AND gate 1127, which indicates the manifestation of a zero count within the outgoing digit store, causes a mark to be produced at the output terminal of AND gate 1134 which is forwarded by conductor 1136 to the reset terminal of flip-flop 220, thereby to erase the bit formerly written into the "was one" subcell so that flip-flop 1116 will not again be actuated until a new bit is written into the "was one" subcell. Since an end-of-digit condition has been manifested by the marking of end-of-digit bus 1133, it is necessary at this time to erase the start-sending bit in subcell 91 so that outpulsing cannot occur until a six-hundred millisecond interdigit pause has occurred and subcell 91 again receives a marking by virtue of the operation of flip-flop 1313 and AND gate 1317, which operation was discussed hereinabove. This erasing is accomplished by connecting end-of-digit bus 1133 to the set terminal of flip-flop 1402 so that AND gate 1403 is partially enabled. The output terminal of AND gate 1403 is connected to the reset terminal of flip-flop 241 over conductor 1404 so that during subinterval 90 the start-sending digit bit formerly written into subcell 91 is erased.

As discussed previously, the request-for-translation bit 21 is erased by virtue of AND gate 1005' upon the detection of a request-for-translation condition by flip-flop 1004. Accordingly, it is necessary to rewrite the request-for-translation bit after the complete outpulsing of the first or subsequent routing digits. This is effected by AND gate 1406 which has its first input terminal connected to end-of-digit bus 1133. During subinterval 21, a mark is produced on the output terminal of AND gate 1406 and is impressed upon the conductor 255 of the buffer store, thereby to rewrite the request-for-translation bit into subcell 21.

Subsequent routing digits are outpulsed in the same manner as the first digit. The outpulsing process, described hereinabove, involved only one of the twenty-five cells. However, since the processor is sequentially accessed to all of the twenty-five cells, it may well be that all twenty-five cells are concurrently outpulsing directive information to their associated dial pulse acceptors.

Now, let it be assumed that the sixth and last routing digit has been fully outpulsed. At this time, a count of seven will be manifested in the digits sent store. See FIG. 17A. It is true that a request-for-translation bit will be rewritten into subcell 21 upon the completion of the outpulsing of the sixth routing digit. However, this will have no effect since a "not eight" condition is manifested in the digits sent store so that lead 1105' is no longer marked and access to the translator is accordingly blocked by the disenabling of AND gates 1202, 1203 and 1204. As a result, no further data will be forwarded from the translator through OR gates 1103 into the outgoing digit store.

The stage is now set for sequentially spilling out the dialed digits contained within the digit stores (subcells 23–56). The digits sent store 1106 together with AND gates 1122 and 1138 are utilized to sequentially spill out the dialed digits into the outgoing digit store. The first dialed digit contained within the first digit store (subcells 23–26) is spilled out into the outgoing digit store. The outpulsing of this first spilled out digit occurs in the same manner as the outpulsing of the translated routing digits. When the first spilled out digit is fully outpulsed, the count within the digits sent store is reduced by one; that is, from seven to six, and the second dialed digit contained within the second digit store (subcells 28–31) is transferred into the outgoing digit store and outpulsed. The third, fourth, fifth, sixth and seventh digits are thereafter sequentially spilled out and outpulsed in like manner.

The binary-to-decimal converter 1139 has seven output leads, each of which partially enables an associated gate 1122, as shown in FIG. 11A. The binary input to converter 1139 is obtained from flip-flops 832 of the impulse distributor disclosed in FIG. 8B. The significance of this arrangement is that AND gate 1122–7 is partially enabled to effect spill out of the first dialed digit only after dialing of the first dialed digit has been completed. That is, only if the impulse distributor is at least in the process of causing the second or subsequent digits to be inserted into the digit stores. Similarly, only if the dialing of the second dialed digit has been completed will gate 1122–6 be partially enabled by converter 1139 to effect spill out of the second digit. Without converter 1139, spill out of incompletely impulsed digits might occur.

Upon an end-of-digit zero count condition in the outgoing digit store 1104 (1138 is marked), upon manifestation of a count of seven in the digits sent store and upon concurrent manifestation of a condition which indicates that the impulsing of the first digit has been completed, at subinterval 24, a mark will be applied by AND gate 1122–7 to the enabling terminals of AND gates 1138 through OR gate 1123 and, accordingly, the first digit which is contained within the buffer store during subinterval 24 will pass through AND gates 1138 and will be inserted into the outgoing digit store 1104 via OR gates 1103. The outpulsing of this first dialed digit proceeds in the same manner as the out-pulsing of the translated routing digits. When outpulsing of this first dialed digit is completed, an end-of-digit (outgoing digit store zero) condition will be manifested to partially enable AND gate 1122 once more. The count within the digits sent store is reduced from seven to six and, accordingly, AND gate 1122–6 is partially enabled by virtue of the marking of lead 1122–6′ and if the impulsing of the second dialed digit has been completed (the binary two output conductor of converter 1139 is marked), a mark will be forwarded by AND gate 1122–6 to the enabling terminals of AND gate 1138 through OR gate 1123, which mark will occur during subinterval 29 instead of subinterval 24, which was previously the case where the first digit was spilled out. During subinterval 29, the contents of the second digit store (subcells 28–31) are present in the buffer store and, accordingly, the second dialed digit will pass through AND gates 1138 and will be inserted into outgoing digit store 1104 via OR gates 1103. After the outpulsing of the second digit, subsequent sequential spill out of the remaining digits will occur owing to the sequential operation of AND gates 1122–5 through AND gate 1122–1.

Individual input terminals of AND gates 1122 are coupled through a standard binary-to-decimal matrix (not shown) contained within the digits sent store so that the manifestation of a count of seven in the digits sent store partially enables AND gate 1122–7. Similarly, manifestation of a count of six in the digits sent store enables AND gate 1122–6 and the other AND gates 1122 are sequentially enabled as the count is reduced further within the digits sent store. The above-mentioned binary-to-decimal matrix could be similar to the binary-to-decimal translator AND gates 240 together with their respective connections to the output terminals of the flip-flops of the buffer store.

*Cell clearance*

The circuitry of FIG. 6, operating in conjunction with the register release subcell 13, is utilized to control the clearance of individual cells of information contained therein when the cell is to be released. Therefore, release register bit 13 is marked when it is desired to retain data within the associated cell and is erased when clearance of the associated cell is desired. This mark will be retained in subcell 13 until the cell is to be cleared upon the manifestation of a final on-hook condition, a twenty-seven second time out condition, or when the last digit is spilled out by the outgoing digit store. If a subscriber removes his handset from its associated cradle and, before dialing has commenced or is completed, takes no action for a period of twenty-seven seconds, the cell which is assigned to the dial pulse acceptor associated with said subscirber is cleared so as not to tie up the cell. This is called a twenty-seven second time out condition.

Upon the manifestation of an initial off-hook condition on impulsing pulse 711, flip-flop 890 is set since its set terminal is connected to the on-to-off hook conductor 813 of level change indicator 811. The set of flip-flop 890 causes the full enablement of AND gate 891 so that a mark is transmitted to set terminal 218 of the right-hand flip-flop of buffer store 212 during subinterval 13. This action causes release register subcell 13 to become marked.

Let it be assumed that subcell 13 has just been marked pursuant to the manifestation of an off-hook condition upon off-hook bus 711 for a particular cell. This particular cell emerges once again from the main delay line store 410. Flip-flop 621, of FIG. 6, will become set by the application of a mark to its set terminal at subinterval 4, which mark passes through OR gate 622. The first input terminal 623 of AND gate 624 becomes marked owing to the setting of flip-flop 621. This mark continues to be applied to terminal 623 as the above-mentioned cell passes through buffer store 212 and, accordingly, timing bits 6, 11, 16, 21, 26, 31, 36 . . . 86, and 91 are applied via lead 614 to enable data to be read out of buffer store 212 and to be reinserted into read-in shift register 412, as discussed hereinbefore. This mark applied to enable AND gate 624 also enables AND gate 626, which causes marks to be impressed on conductor 618 during subintervals 61 and 96 so that data passing through subtraction half-adder 320 also is allowed to continue recirculating through the system, all as explained hereinbefore.

Now let it be assumed that the final on-hook condition is detected for this cell and, consequently, release register bit 13 is erased by virtue of the full enabling of AND gate 881. Under these circumstances, a mark will be produced on "not bit 13" lead 218″, which is connected to the "not" binary one output terminal of flip-flop 218. As a result, AND gate 627 becomes fully enabled during subinterval 13, thereby to cause a mark to pass through OR gate 628 which causes flip-flop 621 to become reset and remain reset until subinterval 64 when a mark passes through OR gate 622 to again set flip-flop 621. Accordingly, between subinterval 13 and subinterval 64, AND gates 624 and 626 become disenabled, thereby to prevent the recirculation of data occupying subcells 13–61 so as to partially clear the cell. When AND gate 627 produces a mark, this mark also causes flip-flop 631 to become set and, accordingly, during subinterval 68, AND gate 632 becomes fully enabled thereby to cause a mark to pass through OR gate 628 to again reset flip-flop 621 so as to again disenable AND gates 624 and 626. These gates remain disenabled until the next cell emerges from the main delay line store 410 and a timing bit, at subinterval 4, passes through OR gate 622 to set flip-flop 621. Therefore, it should be apparent that the absence of release register bit 13 causes a particular cell to be cleared of data except for the forty-millisecond counter occupying subcells 63–66, and except for the impulse analyzer counter and count-of-two subcell.

Bit 13 is also erased by AND gate 1405 to clear the cell when the digits sent store contains a count of zero (1006′ is marked) and the outgoing digit store also contains a count of zero to indicate that the multiple register sender is no longer needed by a particular dial pulse acceptor since all numbers have been fully outpulsed and, therefore, a particular cell is to be cleared.

It is also desired to clear a particular cell upon the manifestation of a twenty-seven second time out condition. The circuitry of FIGS. 18 and 19 is utilized to detect such a condition to cause release register subcell 13 to be cleared. As mentioned hereinbefore, the count of the forty-millisecond counter (subcells 63–66) is increased by one every 2.5 milliseconds, or every recirculation. Since AND gate 1801 is connected to the count-of-fifteen output terminal 241 of the binary-to-decimal translator 240, a mark will be produced at the output terminal of AND gate 1801 every forty milliseconds, thereby to set flip-flop 1802. At subinterval 68, AND gate 1804 will be fully enabled so as to apply a carry pulse, via add lead 215, which is inserted into the six-hundred millisecond counter. This process will continue until a count of fifteen within the six-hundred millisecond counter is detected by AND gate 1807′ which, in turn, causes flip-flop 1807 to become set. The setting of flip-flop 1807 wll enable AND gate 1808 so that a count of one will be inserted into the nine-second counter during subinterval 73. Therefore, every six-hundred milliseconds, the count in the nine-second counter will be increased by one. Upon the manifestation of a count of fifteen within the nine-second counter, AND gate 1811 will produce an output pulse indicative of the passage of nine seconds of a continuous off-hook condition. At this time, flip-flop 1809 becomes set so that, at subinterval 78, AND gate 1812 causes a carry mark to be inserted into the twenty-seven second counter. The manifestation of a count of three within the twenty-seven second counter, where each count is equal to nine seconds, is utilized to erase release register bit 13 so as to cause the cell to be cleared. It should be appreciated that if the off-hook condition is interrupted by subscriber dialing before the passage of twenty-seven seconds, the counts within the six-hundred millisecond counter, the nine-second counter, and the twenty-seven second counter will be erased so that the cell is not cleared if a continuous off-hook condition exists for less than twenty-seven seconds. This process is carried out by reset circuit 820. The interruption of the off-hook condition causes flip-flop 820' to be set until subinterval 100 so as to allow AND gates 820'' to rest the counters.

However, it is interesting to note that a mark will be produced on count-of-three output lead 271 of binary-to-decimal translator 240 to indicate a twenty-seven second time out condition during subintervals 78–81. Since such a manifestation cannot be immediately utilized to erase bit 13 which, at this time, has been reinserted into the main delay line store, it will be necessary for the multiple register sender ot memorize the fact that bit 13 is to be erased when the particular cell involved again emerges from main delay line store 410. This process may be carried out by the circuitry of FIG. 19.

For purposes of explanation, let it be assumed that a count of three has just been registered in the twenty-fifth cell which is associated with the twenty-fifth dial pulse acceptor. During subinterval 79, AND gate 1901 becomes fully enabled since its upper input terminal is connected to count-of-three output terminal 271 of binary-to-decimal translator 240. As a result, a mark is produced on twenty-seven second time out bus 1902, which bus is connected to a bank of AND gates for controlling a bank of associated flip-flops, as shown in FIG. 19. However, at this time, only AND gate 1903 will become fully enabled since only the twenty-fifth output terminal of dial pulse acceptor distributor 712 is marked. As a result, flip-flop 1904 becomes set and remains set, while dial pulse acceptor distributor 712 continues to recycle. When the twenty-fifth cell emerges from main delay line store 410, the twenty-fifth output terminal of dial pulse acceptor distributor 712 will again become marked which further enables AND gate 1906, which is already partially enabled by the prior setting of flip-flop 1904. During subinterval 13, AND gate 1906 will be fully enabled so as to cause a bit to be forwarded through OR gate 1907, thereby to erase release register bit 13. The production of a mark at the output terminal of AND gate 1906 also causes flip-flop 1904 to become reset so that a twenty-seven second time out mark within the twenty-fifth cell must again be present to set the stage for the erasure of bit 13. The erasure of bit 13 causes the cell to be cleared, as mentioned hereinabove.

Upon the erasure of bit 13, it s also desired to inform the dial pulse acceptor that the particular cell is being cleared and, therefore, is in a condition to receive new data associated with a fresh call. A "not bit 13" condition is detected by AND gate 715 and is forwarded to that dial pulse acceptor associated with the cleared cell.

While there has been disclosed what is at present considered to be the preferred embodiment of the invention, other modifications will readily occur to those skilled in the art. It is not, therefore, desired that the invention be limited to the specific arrangement shown and described, and it is intended in the appended claims to cover all such modifications as fall within the true spirit and scope of the invention.

What is claimed is:

1. In a telephone system, (a) an on-hook off-hook signal bus, (b) a dial pulse acceptor for selectively producing a first and second electrical condition on said bus, (c) a condition change indicator coupled to said bus for producing a condition change signal upon a change of condition on said bus, (d) a free running impulse analyzer counter, (e) means coupled between said condition change indicator and said free running impulse analyzer counter for causing said free running impulse analyzer counter to become reset and to commence recounting upon the production of a condition change signal by said condition indicator, (f) a first digit impulse counter, a second digit impulse counter, a steering counter, (g) means coupled to said free running impulse analyzer counter for producing a first-minimum-interval signal when the count in said free running impulse analyzer counter reaches a first value and for producing a second-minimum-interval signal when the count in said free running impulse analyzer counter reaches a second value greater than said first value, (h) means responsive to the production of said first-minimum-interval signal and the production of a condition change signal from said first condition to said second condition by said condition change indicator for changing the count within said first digit counter, (i) means responsive to the production of said second-minimum-interval signal and the continuation of said second electrical condition upon said bus for changing the count within said steering counter, and (j) means responsive to the aforementioned change in the count in said steering counter for changing the count within said second digit counter but not said first digit counter upon the subsequent production of a said first-minimum-interval signal and said condition change signal from said first condition to said second condition.

2. In a telephone system, (a) an on-hook off-hook signal bus, (b) a dial pulse acceptor for selectively producing an on-hook and an off-hook condition on said bus, (c) a condition change indicator coupled to said bus for producing a condition change signal upon a change of condition on said bus, (d) a free running impulse analyzer counter, (e) means coupled between said condition change indicator and said free running impulse analyzer counter for causing said free running impulse analyzer counter to become reset and to commence recounting upon the production of a condition change signal by said condition indicator, (f) a first digit impulse counter, a second digit impulse counter, a steering counter, (g) means coupled to said free running impulse analyzer counter for producing a first-minimum-interval signal when the count in said free running impulse analyzer counter reaches a first value and for producing a second-minimum-interval signal when the count in said free running impulse analyzer counter reaches a second value greater than said first value, (h) means responsive to the production of said first-minimum-interval signal and the production of a condition change signal from said on-hook condition to said off-hook condition by said condition change indicator for increasing the count within said first digit counter by one, (i) means responsive to the production of said second-minimum-interval signal and the continuation of said second off-hook condition upon said bus for increasing the count within said steering counter by one, and (j) means responsive to the aforementioned increased count in said steering counter for increasing the count within said second digit counter but not said first digit counter upon the subsequent production of a said first-minimum-interval signal and said condition change signal from said on-hook condition to said off-hook condition.

3. In a telephone system, (a) an input bus, (b) means for selectively producing a first and second electrical condition on said input bus, (c) a condition change indicator coupled to said input bus for producing condition change signals upon a change of condition on said input bus, (d) a free running impulse analyzer counter, (e) means coupled between said condition change indicator and said free running impulse analyzer counter for causing said free running impulse analyzer counter to become reset and to commence recounting upon the production of a condition change signal by said condition indicator, (f) a first digit impulse counter, a second digit impulse counter, a steering counter, (g) means coupled to said free running impulse analyzer counter for producing a first-minimum-interval signal when the count in said free running impulse analyzer counter reaches a first value and for producing a second-minimum-interval signal when the count in said free running impulse analyzer counter reaches a second value greater than said first value, (h) means responsive to the production of said first-minimum-interval signal and the production of a condition change signal from said first condition to said second condition by said condition change indicator for increasing the count within said first digit counter, (i) means responsive to the production of said second-minimum-interval signal and the continuation of said second electrical condition upon said input bus for increasing the count within said steering counter, and (j) means responsive to the aforementioned increased count in said steering counter for increasing the count within said second digit counter but not said first digit counter upon the subsequent production of a said first-minimum-interval signal and said condition change signal from said first condition to said second condition.

4. In a telephone system, (a) a plurality of data sources, (b) a dynamic recirculating type storage loop for storing in serial fashion in a plurality of recirculating cells data produced by said plurality of data sources, each cell being associated with a particular data source, (c) a write-in circuit coupled to said recirculation storage loop, (d) means for sequentially coupling each of said data sources to said write-in circuit in a plurality of steps, and (e) means responsive to the presence of start-of-cell signals present at particular points in said recirculation loop, each start-of-cell signal being associated with a particular recirculating cell within said storage loop, for causing said means for sequentially coupling to step.

5. The combination as set forth in claim 4 further including means responsive to the presence of a start-of-frame signal at a particular point in said recirculation loop, which start-of-frame signal is associated with one particular recirculating cell within said storage loop, for insuring that said means for sequentially coupling is coupling a particular data source to said write-in circuit.

6. In a telephone system, (a) an input bus, (b) means for producing a first and second electrical condition on said input bus, (c) a condition change indicator coupled to said input bus for producing a condition change signal upon a change of condition on said input bus, (d) a free running counter, and (e) means coupled between said condition change indicator and said free running counter for causing said free running counter to become reset upon the production of a condition change signal by said condition change indicator.

7. In a telephone system, (a) an input bus, (b) means for producing a first and second electrical condition on said input bus, (c) a condition change indicator coupled to saia input bus for producing a condition change signal upon a change of condition on said input bus, (d) a free running counter, (e) means coupled between said condition change indicator and said free running counter for causing said free running counter to become reset and to commence counting upon the production of a condition change signal by said condition change indicator, (f) means coupled to said free running counter for producing a minimum interval signal when the coun- in said free running counter reaches a certain value, and (g) means responsive to the production of said minimum interval signal and the production of a condition change signal by said condition change indicator for registering the receipt of an information signal over said input bus.

8. In a telephone system, (a) an input bus, (b) means for producing a first and second voltage level on said input bus, (c) a level change indicator coupled to said input bus for producing a level change signal upon a change of voltage level on said input bus, (d) a free running counter, (e) means coupled between said level change indicator and said free running counter for causing said free running counter to become reset and to commence counting upon the production of a level change signal by said level change indicator, (f) means coupled to said free running counter for producting a minimum interval signal when the counter in said free running counter reaches a certain value, and (g) means responsive to the production of said minimum interval signal and the production of a level change signal by said level change indicator for registering the receipt of an information signal over said input bus.

9. In a telephone system, (a) a dynamic recirculating type of storage loop for storing data in serial fashion in a plurality of recirculating cells, each cell comprising a plurality of subcells, (b) a source of groups of data to be written into said storage loop, (c) a write-in circuit coupled to said storage loop at a particular point in said storage loop, and (d) means coupled to said data source and to said write-in circuit for causing a first group of said groups of data to be recorded within a first group of subcells and for causing the Nth group in said groups of data to be recorded into an Nth group of subcells, where N is an integer.

10. In a telephone system, (a) a dynamic recirculating type of storage loop for storing data in serial fashion in a plurality of recirculating cells, each cell comprising a plurality of subcells, (b) a source of groups of data to be serially written into said storage loop, (c) a write-in circuit coupled to said storage loop at a particular point in said storage loop, and (d) means coupled to said data source and to said write-in circuit for causing a first group of said groups of data to be recorded within a first group of subcells in a particular cell and for causing the Nth group in said groups of data to be recorded into an Nth group of subcells in a particular cell, where N is an integer.

11. In a telephone system, (a) a dynamic recirculating type of storage loop for storing data in serial fashion in a plurality of M recirculating cells, each cell comprising a plurality of subcells, where M is an integer, (b) M sources of groups of data to be written into said storage loop, (c) a write-in circuit coupled to said storage loop, (d) means coupled to said data sources and to said write-in circuit for causing a first group of said groups of data produced by a first source of said M sources to be recorded within a first group of subcells in a first cell, (e) means for causing the $N^{th}$ group in said groups of data produced by said first source to be recorded within an $N^{th}$ group of subcells in said first cell, where N is an integer, (f) means for causing a first group of said groups of data produced by an $M^{th}$ source of said M sources to be recorded within a first group of subcells in an $M^{th}$ cell, and (g) means for causing an $N^{th}$ group of said groups of data produced by said $M^{th}$ source to be recorded within an $N^{th}$ group of subcells in said $M^{th}$ cell.

12. In a telephone system, (a) a main storage element having an input circuit and an output circuit for serially storing a plurality of words, (b) a first auxiliary storage element having a one word capacity and having an input circuit for receiving a word in parallel and having an output circuit for reading out a word serially, (c) a second auxiliary storage element having a one word capacity and having an input circuit for receiving a word serially and having an output circuit for reading out a word in parallel, (d) means for coupling the output circuit of said first auxiliary storage element to the input circuit of said first main storage element, (e) means for coupling the output circuit of said main storage element to the input circuit of said second auxiliary storage element, (f) a buffer store having a one word capacity and having an input circuit for receiving a word in parallel and having an output circuit for reading out a word in parallel, (g) means for coupling the output circuit of said second auxiliary storage element to the input circuit of said buffer store during a first transfer interval, and (h) means for coupling the output circuit of said buffer store to the input circuit of said first auxiliary storage element during a second transfer interval.

13. The combination as set forth in claim 12 wherein said means for coupling the output circuit of said second auxiliary storage element to the input circuit of said buffer store includes a half-adder bank for altering the word being transferred from said second auxiliary storage element to said buffer store.

14. In a telephone system, (a) a main storage element having an input circuit and an output circuit for serially storing a plurality of words, (b) a first auxiliary storage element having a one word capacity and having an input circuit for receiving a word in parallel and having an output circuit for reading out a word serially, (c) a second auxiliary storage element having a one word capacity and having an input circuit for receiving a word serially and having an output circuit for reading out a word in parallel, (d) means for coupling the output circuit of said first auxiliary storage element to the input circuit of said first main storage element, (e) means for coupling the output circuit of said main storage element to the input circuit of said second auxiliary storage element, (f) a buffer store having a one word capacity and having an input circuit for receiving a word in parallel and having an output circuit for reading out a word in parallel, (g) means for coupling the output circuit of said second auxiliary storage element to the input circuit of said buffer store during a first transfer interval, (h) means for coupling the output circuit of said buffer store to the input circuit of said first auxiliary storage element during a second transfer interval, and (i) means for thereafter clearing said buffer store.

15. The combination as set forth in claim 14 wherein said means for coupling the output circuit of said second auxiliary storage element to the input circuit of said buffer store includes a half-adder bank for altering the word being transferred from said second auxiliary storage element to said buffer store.

16. In a telephone system, (a) a dynamic recirculating type of storage loop for storing data in serial fashion in a plurality of M recirculating cells, each cell comprising a plurality of subcells, M being an integer, (b) M sources of M groups of data to be written into said storage loop, each group being produced by an associated source, (c) a write-in circuit coupled to said storage loop, (d) means coupled to said data sources and to said write-in circuit for causing a first subgroup of the group of data produced by a first source of said M sources to be recorded with a first plurality of subcells in a first cell, (e) means for causing the $N^{th}$ subgroup in the group of data produced by said first source to be recorded within an $N^{th}$ plurality of subcells in said first cell, where N is an integer, (f) means for causing a first subgroup of the group of data produced by an $M^{th}$ source of said M sources to be recorded within a first plurality of subcells in an $M^{th}$ cell, (g) means for causing an $N^{th}$ subgroup of the group of data produced by said $M^{th}$ source to be recorded within an $N^{th}$ plurality of subcells in said $M^{th}$ cell, (h) a processor coupled to said storage loop for sequentially processing the recirculating data stored within said plurality of recirculating cells, (i) means for reading in at least a portion of the $M^{th}$ group of data into said processor from said $M^{th}$ cell, for storing said $M^{th}$ group of data within said processor for a time interval equivalent to at least one recirculation of the $M^{th}$ cell in said loop, for reading out said $M^{th}$ group of data back into said $M^{th}$ cell from said processor, for thereafter reading in at least a portion of the first group of data into said processor from said first cell, for storing said first group within said processor for at least a time interval equal to the time of one recirculation of said first cell in said loop, for reading out said first group of data back into said first cell from said processor, and thereafter repeating in like manner the sequential read out, storage, and read in of at least portions of the groups of data within the second through the $M^{th}$ minus one cells.

17. The combination as set forth in claim 16 wherein said last-named means includes (a) means for earmarking a particular subcell design after a cell-in-processing subcell of a particular single cell which is reading in a particular batch of data into said processor, (b) means for thereafter recognizing the presence of said earmarked subcell after a recirculation of said cell in said loop, (c) means responsive to the recognition of said earmarked subcell by said means for recognizing for causing said particular batch of data to be reinserted into said particular single earmarked cell from said process, and (d) means for erasing said earmark from the aforementioned cell-in-processing subcell of said particular single cell while inserting an earmark into the cell-in-processing subcell of a next adjacent cell.

18. The combination as set forth in claim 16 wherein said last-named means includes (a) means for earmarking a particular subcell designated a cell-in-processing subcell of a particular single cell which is reading in a particular batch of data into said processor, (b) means for thereafter recognizing the presence of said earmarked subcell after a recirculation of said cell in said loop, (c) means responsive to the recognition of said earmarked subcell by said means for recognizing for causing said particular batch of data to be reinserted into said particular single earmarked cell from said processor, and (d) means for erasing said earmark from the aforementioned cell-in-processing subcell of said particular single cell while inserting an earmark into the cell-in-processing subcell of another cell.

19. In a telephone system, (a) a dynamic recirculating type of storage loop for storing data in serial fashion in a plurality of M recirculating cells, each cell comprising a plurality of subcells, M being an integer, (b) M sources of M groups of data to be written into said storage loop, each group being produced by an associated source, (c) a write-in circuit coupled to said storage loop, (d) means coupled to said data sources and to said write-in circuit for causing a first subgroup of the group of data produced by a first source of said M sources to be recorded with a first plurality of subcells in a first cell, (e) means for causing the $N^{th}$ subgroup in the group of data produced by said first source to be recorded within an $N^{th}$ plurality of subcells in said first cell, where N is an integer, (f) means for causing a first subgroup of the group of data produced by an $M^{th}$ source of said M sources to be recorded within a first plurality of subcells in an $M^{th}$ cell, (g) means for causing an $N^{th}$ subgroup of the group of data produced by said $M^{th}$ source to be recorded within an $N^{th}$ plurality of subcells in said $M^{th}$ cell, (h) a data translator, (i) means coupled between said data translator and said storage loop for reading in one or more subgroups of data present in a particular one of said M cells into said translator, (j) means for earmarking a particular subcell designated a cell-in-translator subcell within said particular cell upon the introduction of said subgroups of data into said translator, and (k) means coupled to said storage loop and responsive to said earmarked cell-in-translator subcell for reading out the translated data produced by said translator from said translator back into said particular cell.

20. In a telephone system, (a) a dynamic recirculating type of storage loop for storing data in serial fashion in a plurality of M recirculating cells, each cell comprising a plurality of subcells, M being an integer, (b) M sources of M groups of data to be written into said storage loop, each group being produced by an associated source, (c) a write-in circuit coupled to said storage loop, (d) means coupled to said data sources and to said write-in circuit for causing a first subgroup of the group of data produced by a first source of said M sources to be recorded with a first plurality of subcells in a first cell, (e) means for causing the $N^{th}$ subgroup in the group of data produced by said first source to be recorded within an $N^{th}$ plurality of subcells in said first cell, where N is an integer, (f) means for causing a first subgroup of the group of data produced by an $M^{th}$ source of said M sources of said M sources to be recorded within a first plurality of subcells in an an $M^{th}$ cell, (g) means for causing an $N^{th}$ subgroup of the group of data produced by said $M^{th}$ source to be recorded with an $N^{th}$ plurality of subcells in said $M^{th}$ cell, (h) a data translator having a busy condition and a free condition, (i) means for marking a particular subcell designated a translation request subcell in one or more of said M cells, (j) means coupled between said translator and said storage loop for reading in one or more subgroups of data present in a particular one of said M cells that possesses a marked translation request subcell when said data translator is in a free condition, (k) means responsive to the operation of said means for reading in data into said translator for causing said translator to assume a busy condition so that other cells cannot be accessed to said translator when said translator is in said busy condition, (l) means for marking a cell-in-translator subcell in said particular one of said M cells upon said read-in, and (m) means coupled to said storage loop and responsive to said marked cell-in-translator subcell for reading out said translated data back into said particular cell from said translator.

21. In a telephone system, (a) a recirculating storage loop for containing a recirculating cell which includes a first group of subcells designated as a first digit store, a second group of subcells designated as a second digit store, and a third group of subcells designated as an outgoing digit store, (b) means for generating a first and second digit, (c) means coupled between said means for generating and said storage loop for inserting said first digit into said first digit store and for inserting said second digit into said second digit store, (d) means for transferring said first digit from said first digit store into said outgoing digit store, (e) an outpulsing bus, (f) means for transmitting impulses to said outpulsing bus while subtracting a fixed integer from the count within said outgoing digit store for each impulse transmitted to said outpulsing bus until the count within said outgoing digit store is reduced to zero, (g) means responsive to the reduction of the count within said outgoing digit store to zero for thereafter transferring said second digit from said second digit store into said outgoing digit store, and for causing said means for transmitting to operate in conjunction with the second digit to outpulse said second digit in the manner set forth hereinabove in connection with the outpulsing of said first digit.

22. In a telephone system, (a) a recirculating storage loop for containing sections of recirculating information which includes a first section designated as a first digit store, a second section designated as a second digit store, a third section designated as an outgoing digit store, (b) means for generating a first and second digit, (c) means coupled between said means for generating and said storage loop for inserting said first digit into said first digit store and for inserting said second digit into said second digit store, (d) means for transferring said first digit from said first digit store into said outgoing digit store, (e) an outpulsing bus,
(f) means for transmitting impulses to said outpulsing bus while changing the count within said outgoing digit store a fixed amount for each impulse transmitted to said outpulsing bus until the count within said outgoing digit store reaches a predetermined amount,
(g) means responsive to the count within said outgoing digit store reaching a predetermined amount for thereafter transferring said second digit from said second digit store into said outgoing digit store, and for causing said means for transmitting to operate in conjunction with the second digit to outpulse said second digit in the manner set forth hereinabove in connection with the outpulsing of said first digit.

23. In a telephone system,
(a) a recirculating storage loop for containing a recirculating cell which is made up of a first group of subcells designated as a first digit store, a second group of subcells designated as a second digit store, a third group of subcells designated as a digits sent store, and a fourth group of subcells designated as an outgoing digit store,
(b) means for generating a first and second digit,
(c) means coupled between said means for generating and said storage loop for inserting said first digit into said first digit store and for inserting said second digit into said second digit store,
(d) means for transferring said first digit from said first digit store into said outgoing digit store,
(e) means for inserting a fixed count in said digits sent store,
(f) an outpulsing bus,
(g) means for transmitting impulses to said outpulsing bus while subtracting a fixed integer from the count within said outgoing digit store for each impulse transmitted to said outpulsing bus until the count within said outgoing digit store is reduced to zero,
(h) means responsive to the reduction of the count within said outgoing digit store to zero for reducing the count within said digits sent store by one,
(i) means responsive to the reduction in count within said digits sent store for transferring said second digit from said second digit store into said outgoing digit store, and
(j) means for causing said means for transmitting to operate in conjunction with the second digit in the manner set forth hereinabove in connection with the outpulsing of said first digit.

24. In a telephone system,
(a) a recirculating storage loop for containing sections of recirculating information, which sections are made up of a first section designated as a first digit store, a second section designated as a second digit store, a third section designated as a digits sent store, and a fourth section designated as an outgoing digit store,
(b) means for generating a first and second digit,
(c) means coupled between said means for generating and said storage loop for inserting said first digit into said first digit store and for inserting said second digit into said second digit store,
(d) means for transferring said first digit from said first digit store into said outgoing digit store,
(e) means for inserting a fixed count in said digits sent store,
(f) an outpulsing bus,
(g) means for transmitting impulses to said outpulsing bus while changing the count within said outgoing digit store a fixed amount for each impulse transmitted to said outpulsing bus until the count within said outgoing digit store reaches a predetermined amount,
(h) means responsive to the change in the count within said outgoing digit store to said predetermined amount for changing the count within said digits sent store by a fixed amount,
(i) means responsive to said change in count within said digits sent store for transferring said second digit from said second digit store into said outgoing digit store, and
(j) means for causing said means for transmitting to operate in conjunction with the second digit in the manner set forth hereinabove in connection with the outpulsing of said first digit.

25. In a telephone system,
(a) an outpulsing bus,
(b) means for generating a first group of digits including first and second subgroups of digits,
(c) means for storing said first group of digits,
(d) means for generating a second group of digits corresponding to said first subgroup of digits,
(e) coupling means connecting said storing means to said generating means for transmitting said first subgroup of digits to said generating means and for subsequently returning said first subgroup of digits to said storing means, and
(f) means for transmitting said second group of digits to said outpulsing bus and said first group of digits to said coupling means from said storing means including spill-out means for by-passing said generating means and transmitting said first group of digits to said outpulsing bus upon detection of complete outpulsing of said second group of digits.

26. The combination as set forth in claim 25 wherein said digits are represented by numerical type pulse trains.

27. The combination as set forth in claim 26 wherein said second group of numerical pulse trains have more pulse trains than said first subgroup of pulse trains.

28. The combination as set forth in claim 26 wherein said transmitting means includes means for sequentially applying the pulses of each pulse train to said outpulsing bus so that each digit is outpulsed as a serie of pulses of specific numerical count.

29. In a telephone system,
(a) a main storage circuit,
(b) means for inserting a first group of digits into said main storage circuit,
(c) an outgoing digit store,
(d) a digits sent store,
(e) a translator for converting said first group of digits into a second group of digits,
(f) means coupled to said main storage circuit for inserting said first group of digits into said translator,
(g) an outpulsing bus,
(h) means coupled to the output circuit of said translator for transmitting the first digit of said second group of digits produced by said translator into said outgoing digit store,
(i) means coupled to said outgoing digit store for producing impulses on said outpulsing bus while subtracting a fixed count from the first digit of said second group of digits inserted within said outgoing digit store for each impulse produced until the count within said outgoing digit store reaches zero,
(j) means responsive to the presence of the zero count within said outgoing digit store for changing the count within said digits sent store, and
(k) means responsive to said changed count within said digits sent store for causing the second digit of said second group of digits produced by said translator to be inserted into said outgoing digit store and to be outpulsed in the same manner as said first digit.

30. In a telephone system,
(a) means for inserting a first and second group of digits into a main storage circuit,
(b) an outgoing digit store,
(c) a digits sent store,
(d) a translator for converting said first group of digits into a third group of digits, (e) means for inserting said first group of digits into said translator,
(f) an outpulsing bus,
(g) means for sequentially inserting the digits of said third group of digits produced by said translator into said outgoing digit store,
(h) means coupled to said outgoing digit store for sequentially impressing pulse trains on said outpulsing bus, the number of pulses in each train being equal to corresponding binary numbers of said third group of digits and the number of trains being equal to the number of binary numbers within said third group,
(i) means for altering the count within said digits sent store each time a digit within said third group is outpulsed until a predetermined count is present in said digits sent store upon the completion of the outpulsing of said third group of digits, and
(j) means responsive to the presence of said predetermined count within said digits sent store for preventing said second group of digits within said main storage circuit from gaining access to said translator and for causing each digit of said second group of digits within said main storage circuit to be sequentially inserted into said outgoing digit store and outpulsed.

31. In a telephone system,
(a) a recirculation loop for the dynamic storage of recirculating binary data,
(b) an outpulsing bus,
(c) an impulse reconstruction counter,
(d) means responsive to a first predetermined count in said impulse reconstruction counter for writing in an impulse going mark into said recirculation loop,
(e) means for reading out said impulse going mark from said recirculation loop,
(f) a gate connected between said means for reading out and said outpulsing bus for impressing output pulses upon said outpulsing bus in response to the reading out of the said impulse going marks from said recirculation loop by said means for reading out, and
(g) means responsive to a second predetermined count in said reconstruction counter for causing said impulse going mark to be erased from said recirculation loop.

32. The combination as set forth in claim 31 wherein means are provided for resetting said impulse reconstruction counter upon the detection of said second predetermined count within said impulse reconstruction counter.

33. The combination as set forth in claim 32 wherein means are provided for causing said impulse reconstruction counter to recommence counting upon the detection of said second predetermined count.

34. The combination as set forth in claim 31 further including an outgoing digit store for keeping track of the number of impulses outpulsed together with means for inhibiting said gate upon the detection of a zero count within said outgoing digit store.

35. The combination as set forth in claim 33 further including an outgoing digit store for keeping track of the number of impulses outpulsed together with means for inhibiting said gate upon the detection of a zero count within said outgoing digit store.

36. In a telephone system,
(a) M sources of directive data, M being an integer,
(b) a recirculation loop having a capacity of M recirculating cells and coupled to said M sources of directive data for storing the directive data produced by each directive data source in an associated recirculating cell,
(c) means for generating control data for each cell and for inserting said control data into each cell receiving directive data from said sources of directive data,
(d) means for producing a clearance signal to indicate that a particular cell is to be cleared, and
(e) means responsive to said means for producing a clearance signal for any particular cell for preventing the recirculation of data within that particular cell, thereby to clear the cell.

37. In a telephone system,
(a) M sources of directive data, M being an integer,
(b) a recirculation loop having a capacity of M recirculating cells and coupled to said M sources for storing the directive data produced by each directive data source in an associated recirculating cell,
(c) means for generating control data for each cell and for inserting said control data into each cell receiving information from said sources of directive data,
(d) means for producing a clearance signal to indicate a particular cell is to be cleared,
(e) means for inserting said clearance signal into said particular cell, and
(f) means for thereafter detecting the presence of said clearance signal within said particular cell for preventing the recirculation of said directive data and said control data within that particular cell, thereby to clear the cell.

38. In a telephone system,
(a) a recirculation loop for the dynamic storage of recirculating binary data,
(b) means inserted in said recirculation loop for sequentially examining first and second groups of recirculating binary data representing first and second counts, respectively,
(c) means for changing the count represented within said first group of recirculating binary data,
(d) means coupled to said means for examining for storing a carry signal in response to the detection of a predetermined count within said first group of recirculating binary data as detected by said means for examining, and
(e) means responsive to the storage of said carry signal by said means for storing for thereafter altering the count within said second group of recirculating binary data.

39. The combination as set forth in claim 38 further including means for clearing said means for storing upon said altering.

References Cited by the Examiner

UNITED STATES PATENTS 3,003,039 10/1961 Faulkner ------------ 179—18

KATHLEEN H. CLAFFY, *Primary Examiner.*

WILLIAM C. COOPER, *Examiner.*